(12) United States Patent
Liu et al.

(10) Patent No.: US 10,037,056 B2
(45) Date of Patent: Jul. 31, 2018

(54) OPTICAL TOUCH DEVICE AND FOLDABLE FRAME ASSEMBLY THEREOF

(71) Applicant: Wistron Corporation, New Taipei (TW)

(72) Inventors: You-Xin Liu, New Taipei (TW); Jr-Shiung Jang, New Taipei (TW); Chia-Te Chou, New Taipei (TW); Shou-Te Wei, New Taipei (TW); Shih-Che Chien, New Taipei (TW); Po-Liang Huang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/791,383

(22) Filed: Oct. 23, 2017

(65) Prior Publication Data

US 2018/0046219 A1 Feb. 15, 2018

Related U.S. Application Data

(62) Division of application No. 14/645,401, filed on Mar. 11, 2015, now Pat. No. 9,829,921, which is a division of application No. 13/657,870, filed on Oct. 23, 2012, now abandoned.

(30) Foreign Application Priority Data

Jul. 3, 2012 (TW) .............................. 101212819 U

(51) Int. Cl.
*G06F 1/16* (2006.01)
*G06F 3/042* (2006.01)

(52) U.S. Cl.
CPC .......... *G06F 1/1641* (2013.01); *G06F 1/1616* (2013.01); *G06F 1/1622* (2013.01); *G06F 3/042* (2013.01); *G06F 3/0421* (2013.01)

(58) Field of Classification Search
CPC ...... G06F 1/1641; G06F 3/042; G06F 1/1616; G06F 3/0421; G06F 1/1622
USPC ......................................... 250/221
See application file for complete search history.

(56) References Cited

U.S. PATENT DOCUMENTS

2007/0248238 A1* 10/2007 Abreu .................... G02C 3/003
　　　　　　　　　　　　　　　　　　　　　381/381
2011/0275959 A1* 11/2011 Casali .................. A61B 3/0083
　　　　　　　　　　　　　　　　　　　　　600/595

* cited by examiner

*Primary Examiner* — Seung C Sohn
(74) *Attorney, Agent, or Firm* — Winston Hsu

(57) ABSTRACT

An optical touch device includes a foldable frame assembly, two image sensing units and two light emitting units. The foldable frame assembly comprises a first frame, a second frame, a third frame and a fourth frame. The two image sensing units are disposed on opposite ends of the fourth frame respectively. The two light emitting units are disposed on opposite ends of the fourth frame respectively and adjacent to the two image sensing units respectively. The frames of the foldable frame assembly are pivotally connected to each other such that the frames can rotate with respect to each other so as to be folded or expanded.

4 Claims, 23 Drawing Sheets

OPTICAL TOUCH DEVICE AND FOLDABLE FRAME ASSEMBLY THEREOF

CROSS REFERENCE TO RELATED APPLICATIONS

This is a division application of Ser. No. 14/645,401, now pending, filed on Mar. 11, 2015, which is a division application of Ser. No. 13/657,870, now abandoned, filed on Oct. 23, 2012.

BACKGROUND OF THE INVENTION

1. Field of the Invention

The disclosure relates to an optical touch device and a foldable frame assembly thereof and, more particularly, to a foldable frame assembly capable of being stored and transported easily and adapted for an optical touch device.

2. Description of the Prior Art

With development of touch technology, in various kinds of consumer electronic products (e.g. display device, all-in-one device, mobile phone, personal digital assistant (PDA), etc.), a touch device has become a main tool for data input. Compared with other touch design, such as a resistive touch design, a capacitive touch design, an ultrasonic touch design, or a projective touch design, an optical touch design has lower cost and is easier to use.

A conventional optical touch device senses a position indicated by a touch object (e.g. finger or stylus) on an indication plane by an optical manner. When an image sensing unit senses the touch object within an sensing region defined on the indication plane, a processing unit of the optical touch device can calculate a position indicated by the touch object accordingly. In general, there is always a frame disposed on a periphery of the indication plane so as to isolate noise (e.g. environmental light) outside of the sensing region and generate distinct brightness variation between the touch object (e.g. finger) and background. The frame of a conventional optical touch device is always embedded in a screen (e.g. AIO) or a board such that the optical touch device cannot be carried easily and cannot be used with other planes. Consequently, the application of the optical touch device is limited.

SUMMARY OF THE INVENTION

The disclosure provides a foldable frame assembly capable of being stored or transported easily and adapted for an optical touch device, so as to solve the aforesaid problems.

According to an embodiment of the disclosure, a foldable frame assembly is adapted for an optical touch device. The foldable frame assembly comprises a first frame, a second frame and a third frame. The second frame is pivotally connected to a first end of the first frame and the third frame is pivotally connected to a second end of the first frame, wherein the first end is opposite to the second end. The second frame and the third frame are capable of rotating with respect to the first frame so as to be folded or expanded with respect to the first frame.

In another embodiment, the second frame comprises a first sub-frame and a second sub-frame, the first sub-frame is pivotally connected to the first end of the first frame, the second sub-frame is pivotally connected to the first sub-frame, the third frame comprises a third sub-frame and a fourth sub-frame, the third sub-frame is pivotally connected to the second end of the first frame, the fourth sub-frame is pivotally connected to the third sub-frame, the foldable frame assembly further comprises a fourth frame, opposite ends of the fourth frame are pivotally connected to the second sub-frame and the fourth sub-frame respectively, the first, second, third and fourth sub-frames are capable of rotating with respect to the first and fourth frames so as to be folded or expanded between the first and fourth frames.

According to another embodiment of the disclosure, an optical touch device comprises a foldable frame assembly, two image sensing units and two light emitting units. The foldable frame assembly comprises a first frame, a second frame and a third frame. The second frame is pivotally connected to a first end of the first frame and the third frame is pivotally connected to a second end of the first frame, wherein the first end is opposite to the second end. The second frame and the third frame are capable of rotating with respect to the first frame so as to be folded or expanded with respect to the first frame. The two image sensing units are disposed on the second frame and the third frame respectively. The two light emitting units are disposed on the second frame and the third frame respectively and adjacent to the two image sensing units respectively.

According to another embodiment of the disclosure, an optical touch device comprises a foldable frame assembly, two image sensing units and two light emitting units. The foldable frame assembly comprises a first frame, a second frame, a third frame and a fourth frame. The second frame comprises a first sub-frame and a second sub-frame, wherein the first sub-frame is pivotally connected to a first end of the first frame and the second sub-frame is pivotally connected to the first sub-frame. The third frame comprises a third sub-frame and a fourth sub-frame, wherein the third sub-frame is pivotally connected to a second end of the first frame, the fourth sub-frame is pivotally connected to the third sub-frame, and the first end is opposite to the second end. Opposite ends of the fourth frame are pivotally connected to the second sub-frame and the fourth sub-frame respectively. The first, second, third and fourth sub-frames are capable of rotating with respect to the first and fourth frames so as to be folded or expanded between the first and fourth frames. The two image sensing units are disposed on opposite ends of the fourth frame respectively. The two light emitting units are disposed on opposite ends of the fourth frame respectively and adjacent to the two image sensing units respectively.

According to another embodiment of the disclosure, a foldable frame assembly comprises a first frame, a second frame, a third frame and a fourth frame. The first frame comprises a first sub-frame and a second sub-frame, wherein the first sub-frame and the second sub-frame are detachably connected to each other. The second frame is pivotally connected to the first sub-frame. The third frame is pivotally connected to the second sub-frame. Opposite ends of the fourth frame are pivotally connected to the second frame and the third frame respectively. When the first sub-frame and the second sub-frame are detached from each other, the first sub-frame and the second sub-frame are capable of rotating with respect to the second frame and the third frame respectively and the second frame and the third frame are capable of rotating with respect to the fourth frame so as to be folded with respect to the fourth frame.

According to another embodiment of the disclosure, an optical touch device comprises a foldable frame assembly, two image sensing units and two light emitting units. The foldable frame assembly comprises a first frame, a second frame, a third frame and a fourth frame. The first frame comprises a first sub-frame and a second sub-frame, wherein the first sub-frame and the second sub-frame are detachably connected to each other. The second frame is pivotally connected to the first sub-frame. The third frame is pivotally connected to the second sub-frame. Opposite ends of the fourth frame are pivotally connected to the second frame and the third frame respectively. When the first sub-frame and the second sub-frame are detached from each other, the first sub-frame and the second sub-frame are capable of rotating with respect to the second frame and the third frame respectively and the second frame and the third frame are capable of rotating with respect to the fourth frame so as to be folded with respect to the fourth frame. The two image sensing units are disposed on opposite ends of the fourth frame respectively. The two light emitting units are disposed on opposite ends of the fourth frame respectively and adjacent to the two image sensing units respectively.

As mentioned in the above, the frames of the foldable frame assembly of the disclosure are pivotally connected to each other such that the frames can rotate with respect to each other so as to be folded or expanded. When a user uses the optical touch device of the disclosure, he or she can rotate the frames of the foldable frame assembly with respect to each other so as to expand the foldable frame assembly on any plane. Then, the optical touch device can be used with a projector or a computer. After using the optical touch device, the user can rotate the frames of the foldable frame assembly so as to fold up the foldable frame assembly. Accordingly, the foldable frame assembly of the disclosure can be stored or transported easily.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
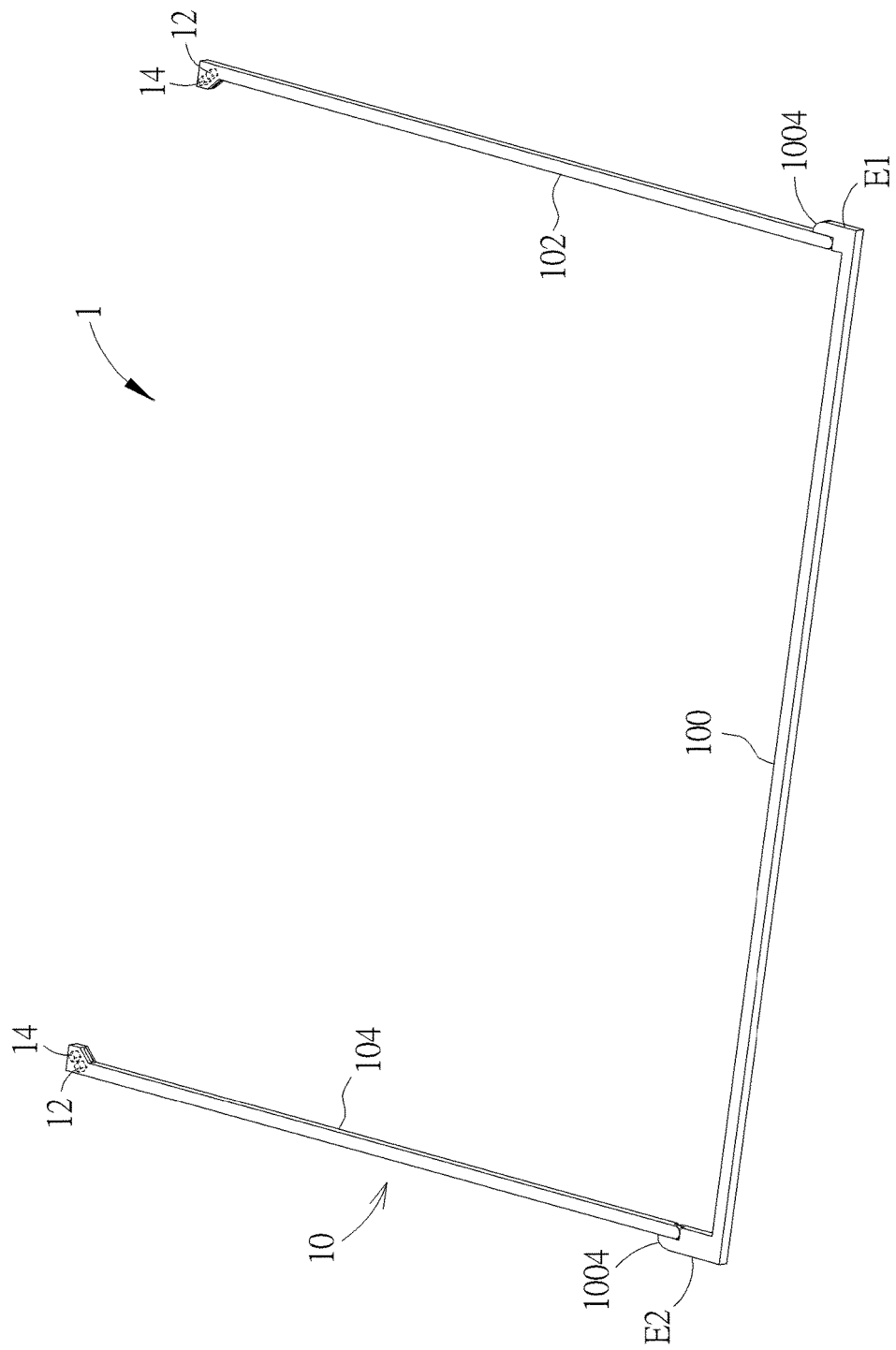
FIG. 1 is a perspective view illustrating an optical touch device being expanded according to an embodiment of the disclosure.
Figure 2:
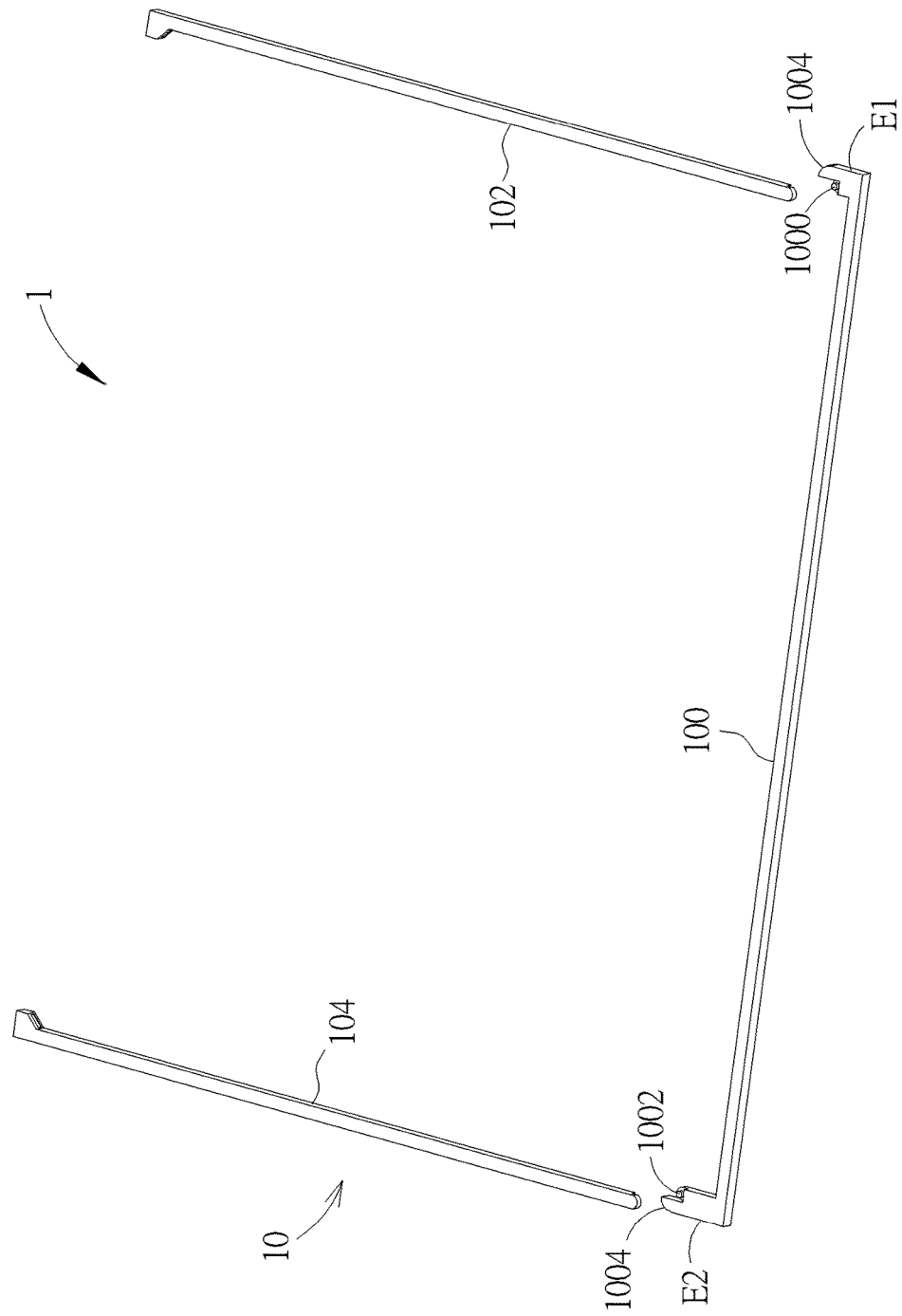
FIG. 2 is an exploded view illustrating the optical touch device shown in FIG. 1.
Figure 3:
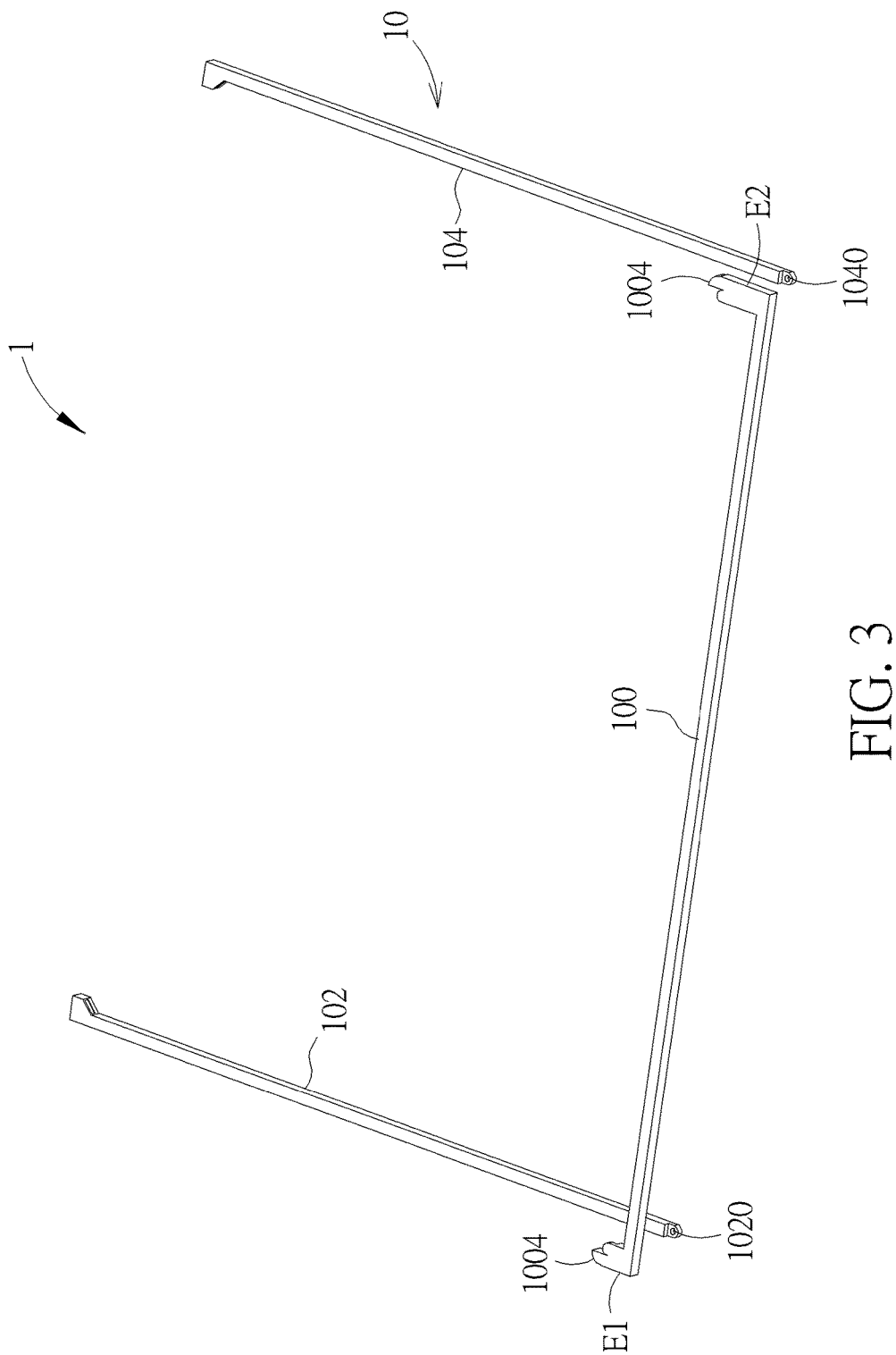
FIG. 3 is an exploded view illustrating the optical touch device shown in FIG. 1 from another viewing angle.
Figure 4:
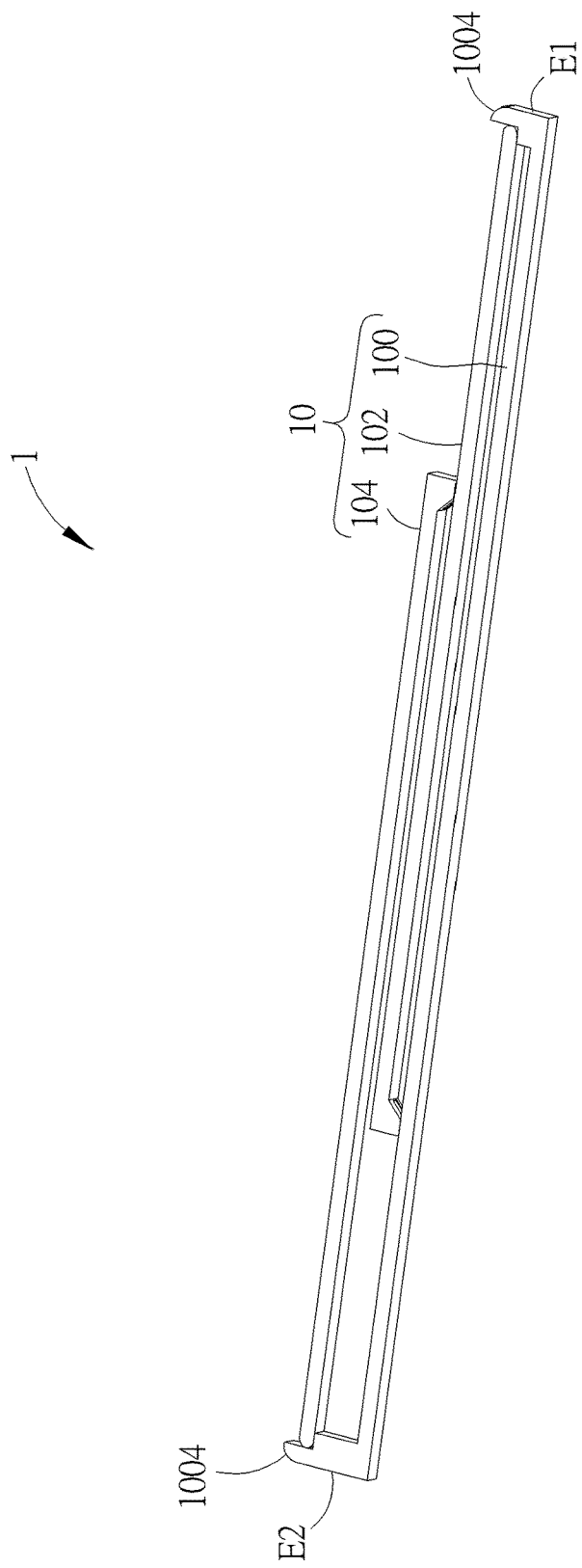
FIG. 4 is a perspective view illustrating the optical touch device shown in FIG. 1 being folded.

Referring to FIGS. 1 to 4, FIG. 1 is a perspective view illustrating an optical touch device 1 being expanded according to an embodiment of the disclosure, FIG. 2 is an exploded view illustrating the optical touch device 1 shown in FIG. 1, FIG. 3 is an exploded view illustrating the optical touch device 1 shown in FIG. 1 from another viewing angle, and FIG. 4 is a perspective view illustrating the optical touch device 1 shown in FIG. 1 being folded. As shown in FIG. 1, the optical touch device 1 comprises a foldable frame assembly 10, two image sensing units 12 and two light emitting units 14. The foldable frame assembly 10 comprises a first frame 100, a second frame 102 and a third frame 104. The second frame 102 is pivotally connected to a first end E1 of the first frame 100 and the third frame 104 is pivotally connected to a second end E2 of the first frame 100, wherein the first end E1 is opposite to the second end E2.

As shown in FIGS. 2 and 3, a pivot hole 1020 on the second frame 102 can be pivotally connected to a pivot axle 1000 on the first end E1 of the first frame 100 and a pivot hole 1040 on the third frame 104 can be pivotally connected to a pivot axle 1002 on the second end E2 of the first frame 100. Accordingly, the second frame 102 and the third frame 104 are capable of rotating with respect to the first frame 100 so as to be folded or expanded with respect to the first frame 100. In this embodiment, the second frame 102 and the third frame 104 are capable of rotating with respect to the first frame 100 in reversed directions so as to be folded on an identical side of the first frame 100, as shown in FIG. 4. When the second frame 102 and the third frame 104 are folded on the identical side of the first frame 100, the second frame 102 is stacked on the first frame 100 and the third frame 104 is stacked on the second frame 102.

In this embodiment, the two image sensing units 12 are disposed on the second frame 102 and the third frame 104 respectively and the two light emitting units 14 are also disposed on the second frame 102 and the third frame 104 respectively and adjacent to the two image sensing units 12 respectively, as shown in FIG. 1. In practical applications, the image sensing unit 12 may be, but not limited to, charge-coupled device (CCD) sensor or complementary metal-oxide semiconductor (CMOS) sensor; the light emitting unit 14 may be, but not limited to, light emitting diode (LED); the first frame 100, the second frame 102 and the third frame 104 may be light-shielding frames or light-reflecting frames. Furthermore, a driving circuit board (not shown) may be disposed in the optical touch device 1, wherein the driving circuit board may be disposed in the first frame 100, the second frame 102 or the third frame 104 and may be electrically connected to the two image sensing units 12 and the two light emitting units 14 by appropriate connection (e.g. through flexible circuit board).

When a user wants to use the optical touch device 1 of the disclosure, he or she can rotate the second frame 102 and the third frame 104 with respect to the first frame 100 so as to expand the foldable frame assembly 10 on any plane (as shown in FIG. 1). Then, the optical touch device 1 can be used with a projector or a computer. When the foldable frame assembly 10 of the optical touch device 1 is expanded, two restraining portions 1004 on the first end E1 and the second end E2 of the first frame 100 can restrain the second frame 102 and the third frame 104 from rotating at a proper position so as to prevent the second frame 102 and the third frame 104 from rotating beyond the limit. After using the optical touch device 1, the user can rotate the second frame 102 and the third frame 104 with respect to the first frame 100 so as to fold up the foldable frame assembly 10 (as shown in FIG. 4). Accordingly, the foldable frame assembly 10 of the disclosure can be stored or transported easily.

Figure 5:
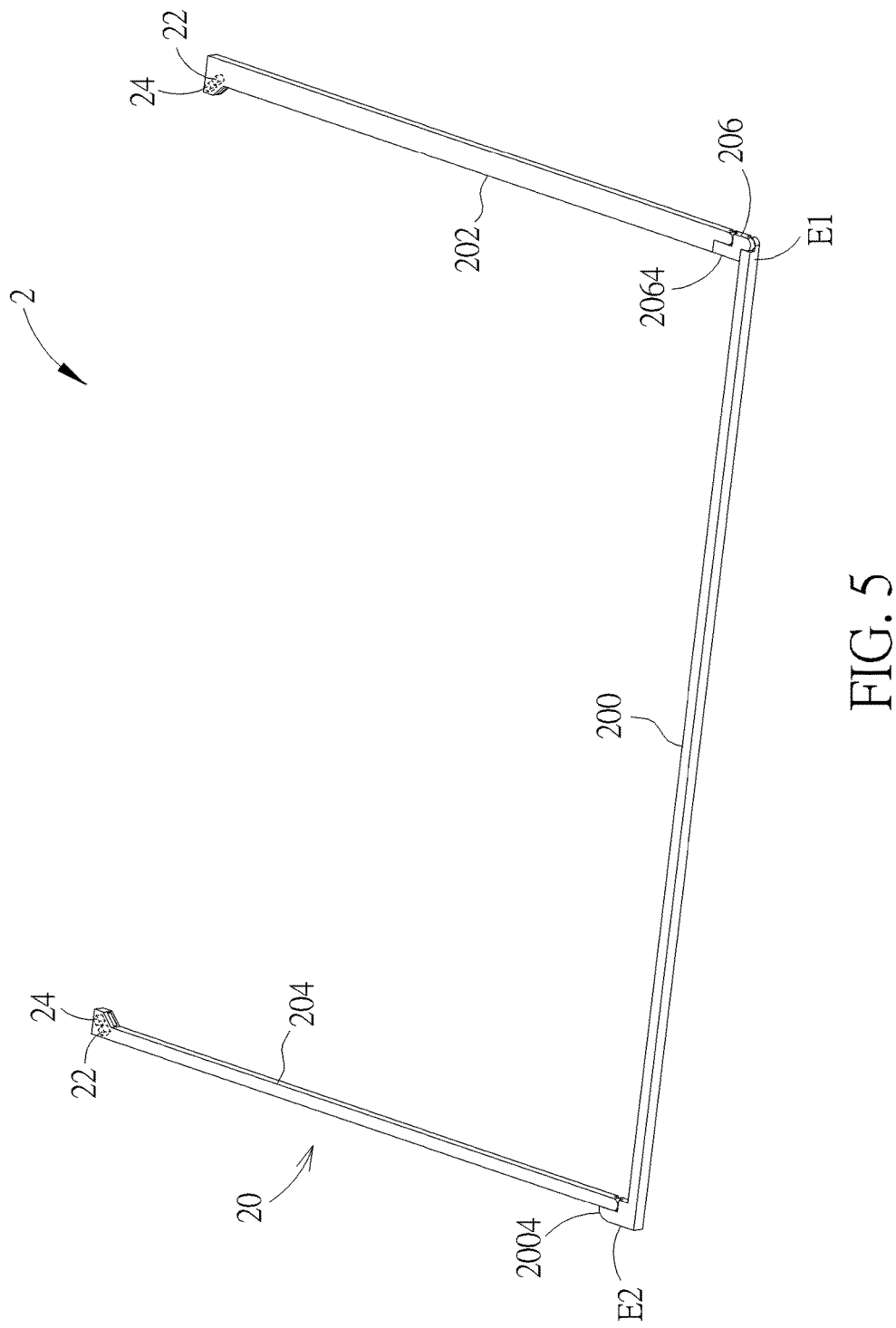
FIG. 5 is a perspective view illustrating an optical touch device being expanded according to another embodiment of the disclosure.
Figure 6:
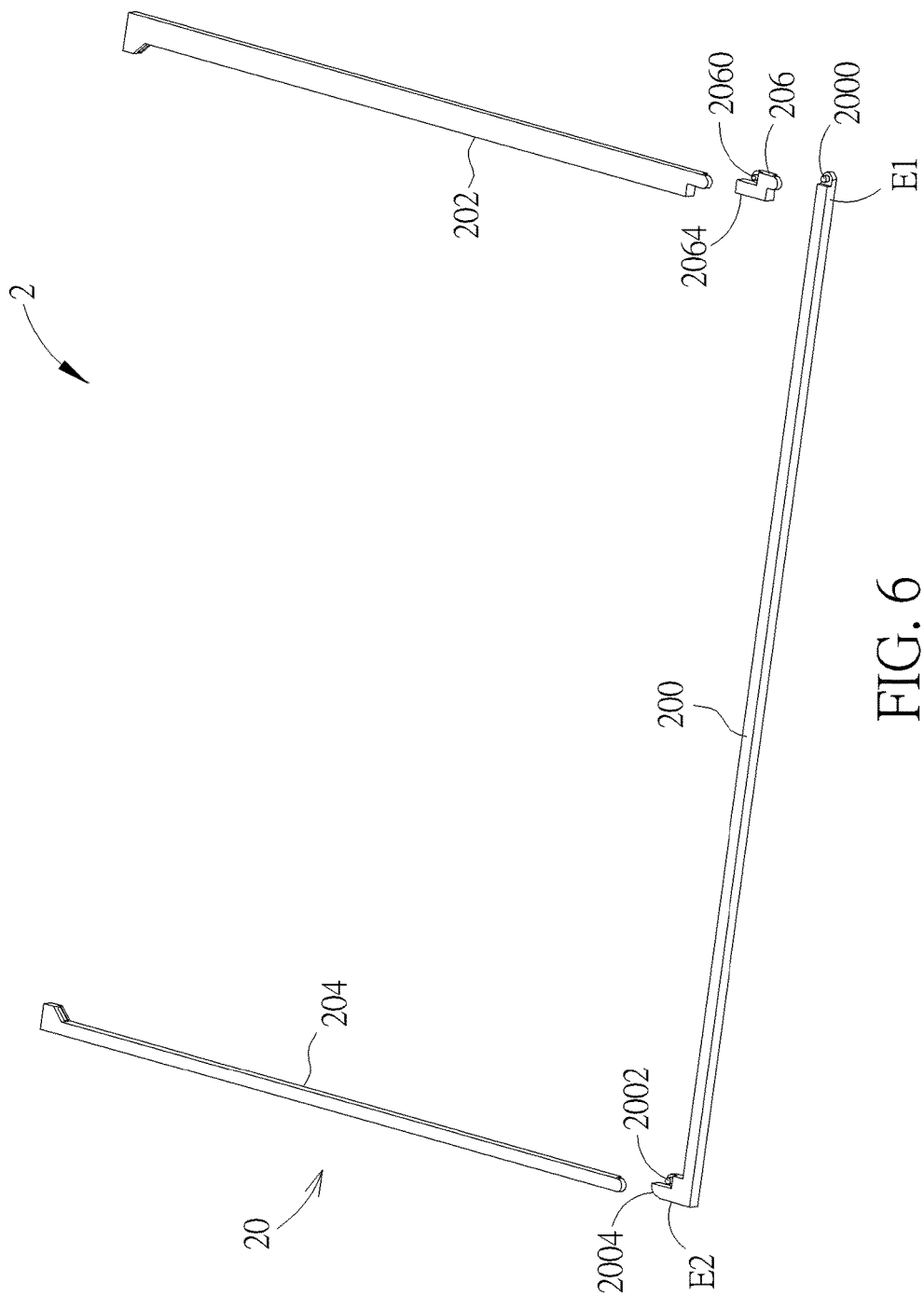
FIG. 6 is an exploded view illustrating the optical touch device shown in FIG. 5.
Figure 7:
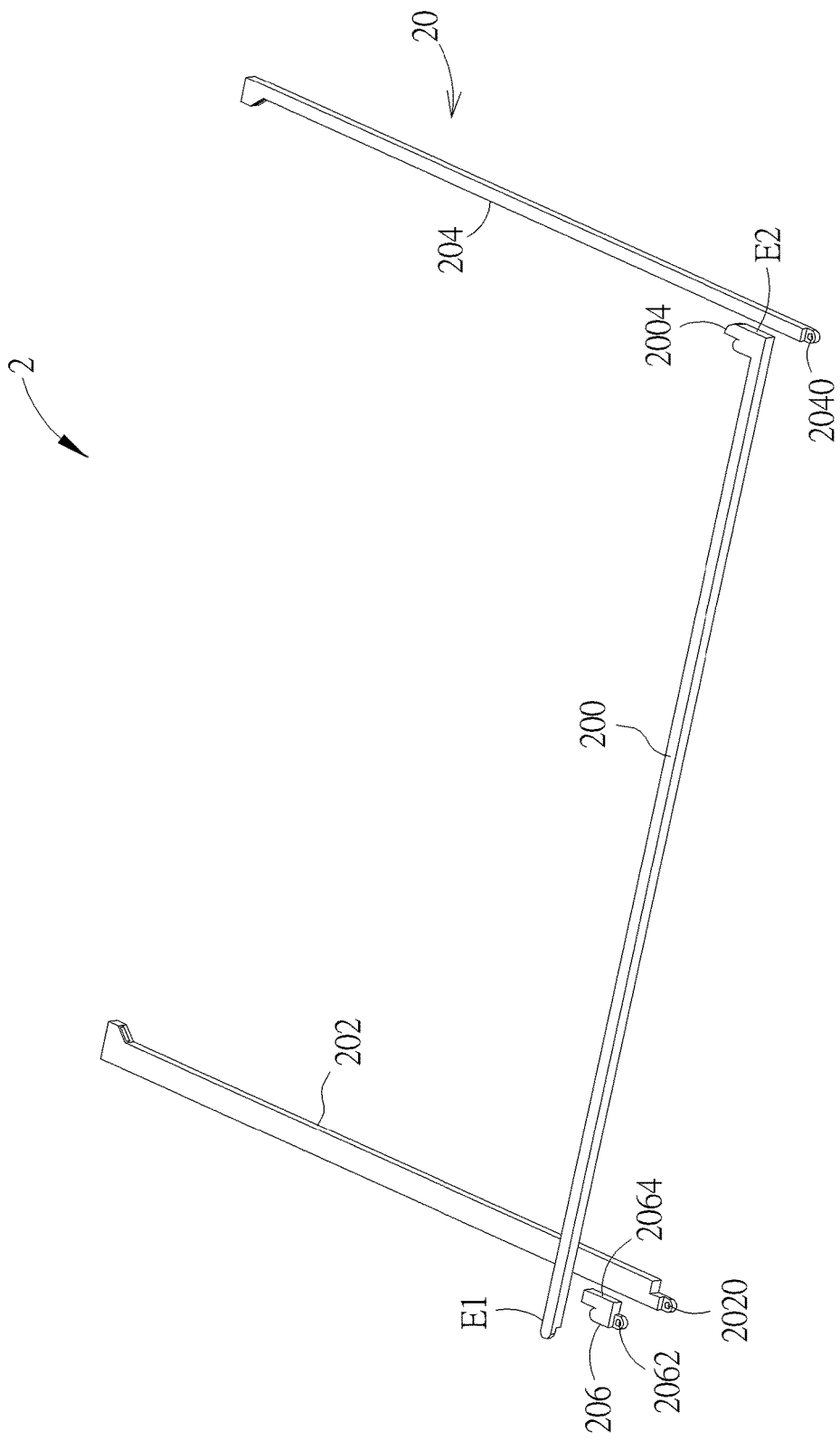
FIG. 7 is an exploded view illustrating the optical touch device shown in FIG. 5 from another viewing angle.
Figure 8:
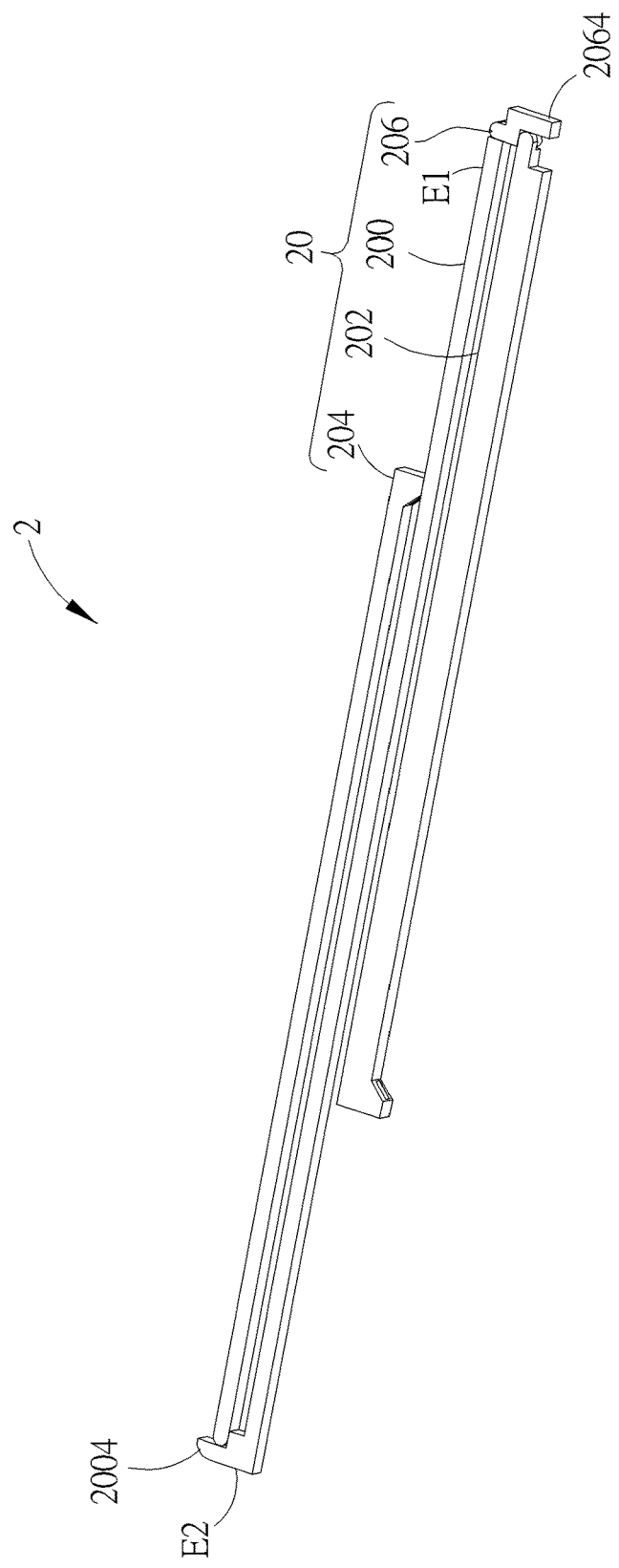
FIG. 8 is a perspective view illustrating the optical touch device shown in FIG. 5 being folded.

Referring to FIGS. 5 to 8, FIG. 5 is a perspective view illustrating an optical touch device 2 being expanded according to another embodiment of the disclosure, FIG. 6 is an exploded view illustrating the optical touch device 2 shown in FIG. 5, FIG. 7 is an exploded view illustrating the optical touch device 2 shown in FIG. 5 from another viewing angle, and FIG. 8 is a perspective view illustrating the optical touch device 2 shown in FIG. 5 being folded. As shown in FIG. 5, the optical touch device 2 comprises a foldable frame assembly 20, two image sensing units 22 and two light emitting units 24. The foldable frame assembly 20 comprises a first frame 200, a second frame 202, a third frame 204 and a pivot member 206. The pivot member 206 is pivotally connected to a first end E1 of the first frame 200, the second frame 202 is pivotally connected to the pivot member 206, and the third frame 204 is pivotally connected to a second end E2 of the first frame 200, wherein the first end E1 is opposite to the second end E2. In other words, the second frame 202 is pivotally connected to the first end E1 of the first frame 200 through the pivot member 206.

As shown in FIGS. 6 and 7, a pivot hole 2020 on the second frame 202 can be pivotally connected to a pivot axle 2060 on the pivot member 206, a pivot hole 2062 can be pivotally connected to a pivot axle 2000 on the first end E1 of the first frame 200, and a pivot hole 2040 on the third frame 204 can be pivotally connected to a pivot axle 2002 on the second end E2 of the first frame 200. Accordingly, the second frame 202 and the third frame 204 are capable of rotating with respect to the first frame 200 so as to be folded or expanded with respect to the first frame 200. In this embodiment, the second frame 202 and the third frame 204 are capable of rotating with respect to the first frame 200 in an identical direction so as to be folded on opposite sides of the first frame 200, as shown in FIG. 8.

In this embodiment, the two image sensing units 22 are disposed on the second frame 202 and the third frame 204 respectively and the two light emitting units 24 are also disposed on the second frame 202 and the third frame 204 respectively and adjacent to the two image sensing units 22 respectively, as shown in FIG. 5. In practical applications, the image sensing unit 22 may be, but not limited to, CCD sensor or CMOS sensor; the light emitting unit 24 may be, but not limited to, LED; the first frame 200, the second frame 202 and the third frame 204 may be light-shielding frames or light-reflecting frames. Furthermore, a driving circuit board (not shown) may be disposed in the optical touch device 2, wherein the driving circuit board may be disposed in the first frame 200, the second frame 202 or the third frame 204 and may be electrically connected to the two image sensing units 22 and the two light emitting units 24 by appropriate connection (e.g. through flexible circuit board).

When a user wants to use the optical touch device 2 of the disclosure, he or she can rotate the second frame 202 and the third frame 204 with respect to the first frame 200 so as to expand the foldable frame assembly 20 on any plane (as shown in FIG. 5). Then, the optical touch device 2 can be used with a projector or a computer. When the foldable frame assembly 20 of the optical touch device 2 is expanded, a restraining portion 2004 on the first end E1 of the first frame 200 and a restraining portion 2064 on the pivot member 206 can restrain the second frame 202 and the third frame 204 from rotating at a proper position so as to prevent the second frame 202 and the third frame 204 from rotating beyond the limit. After using the optical touch device 2, the user can rotate the second frame 202 and the third frame 204 with respect to the first frame 200 so as to fold up the foldable frame assembly 20 (as shown in FIG. 8). Accordingly, the foldable frame assembly 20 of the disclosure can be stored or transported easily.

Figure 9:
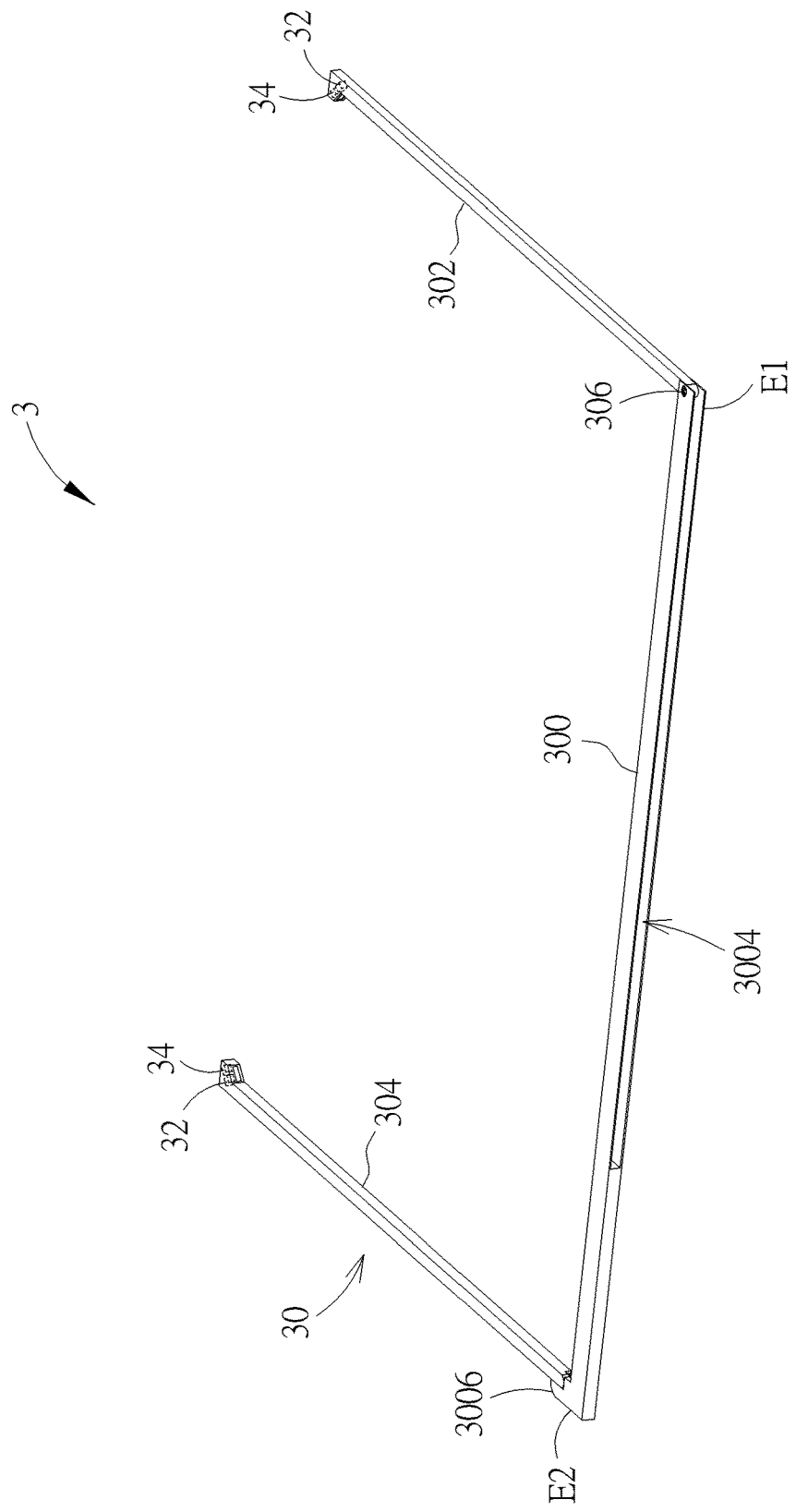
FIG. 9 is a perspective view illustrating an optical touch device being expanded according to another embodiment of the disclosure.
Figure 10:
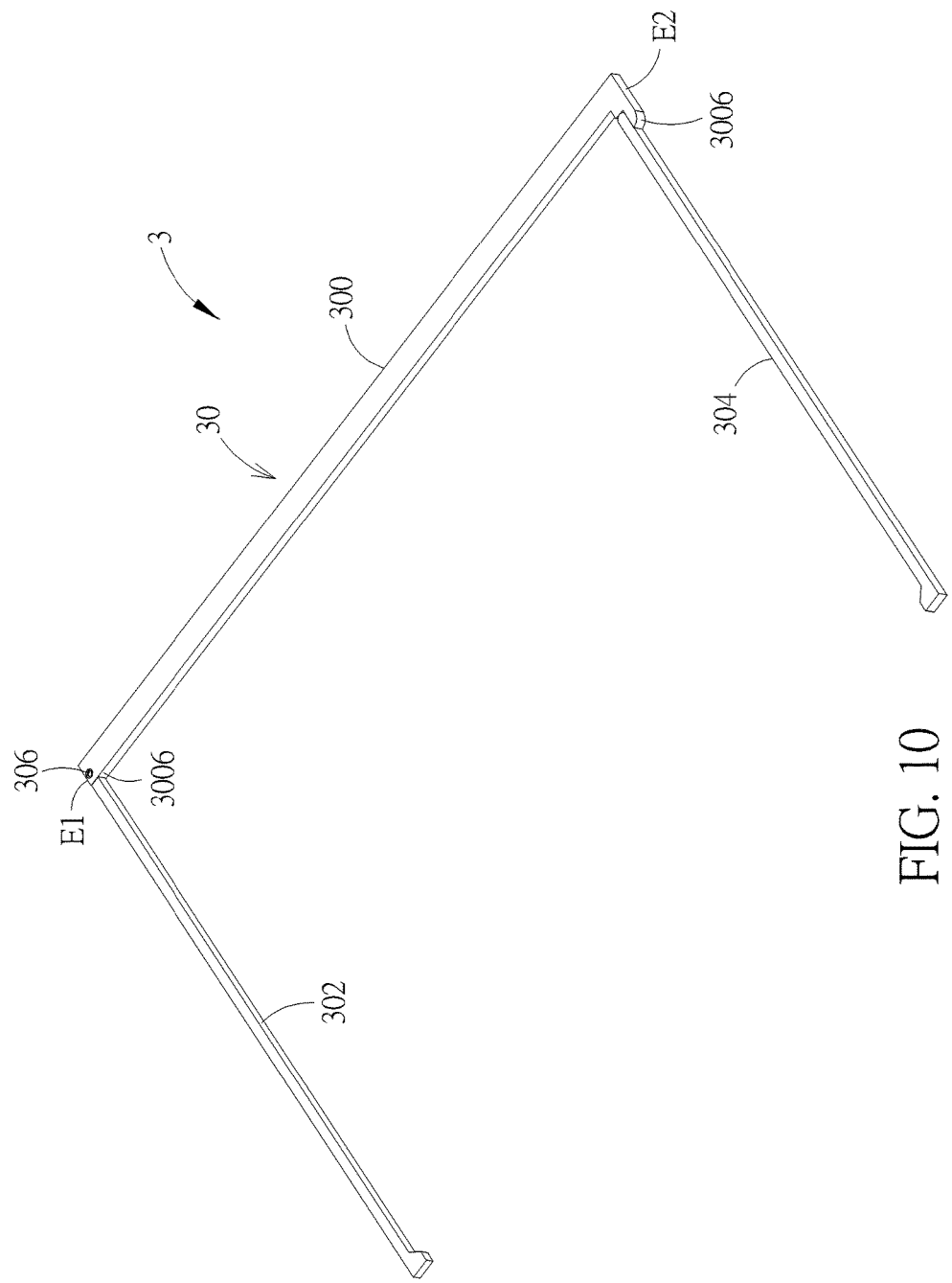
FIG. 10 is a perspective view illustrating the optical touch device shown in FIG. 9 from another viewing angle.
Figure 11:
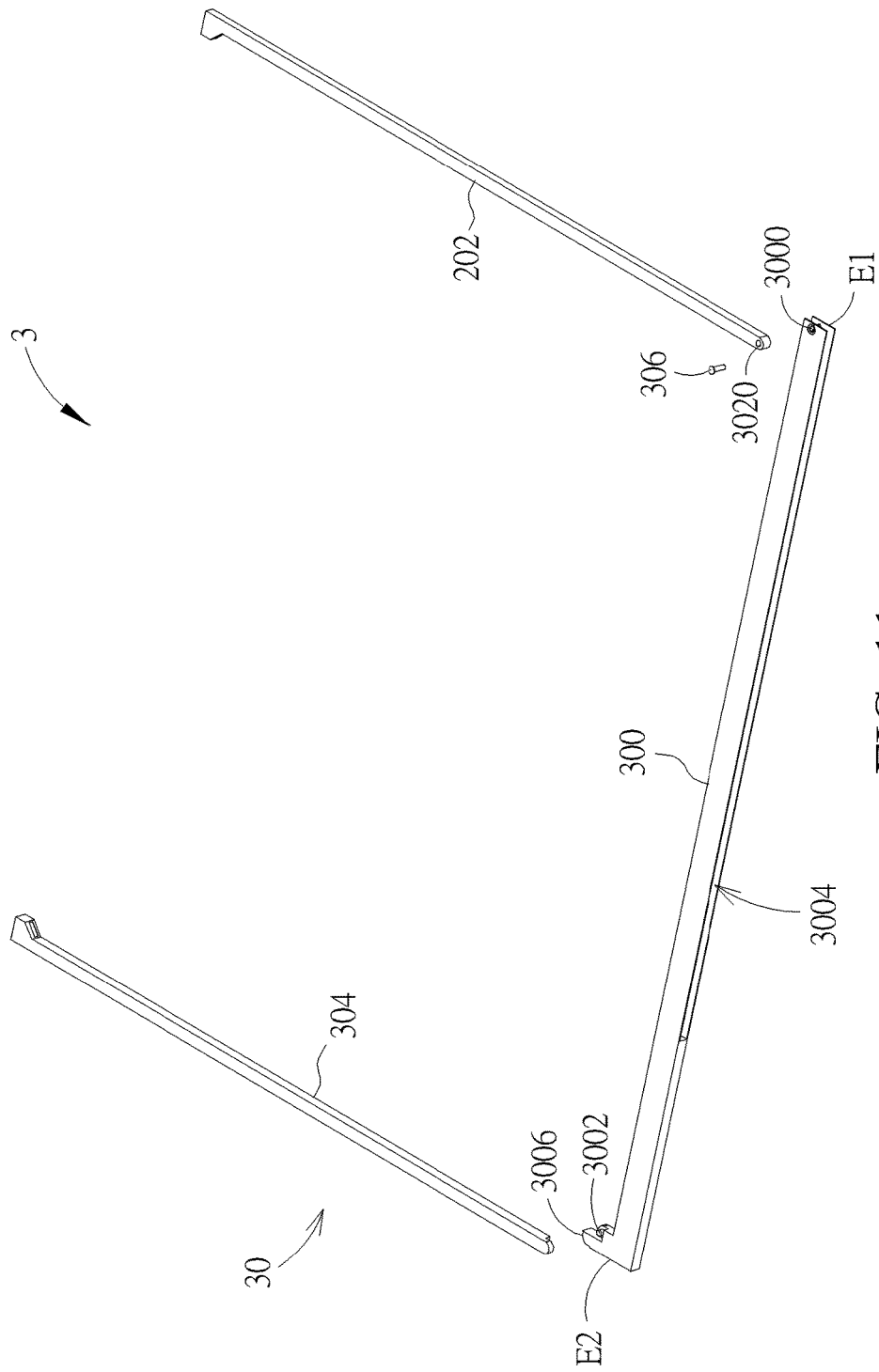
FIG. 11 is an exploded view illustrating the optical touch device shown in FIG. 9.
Figure 12:
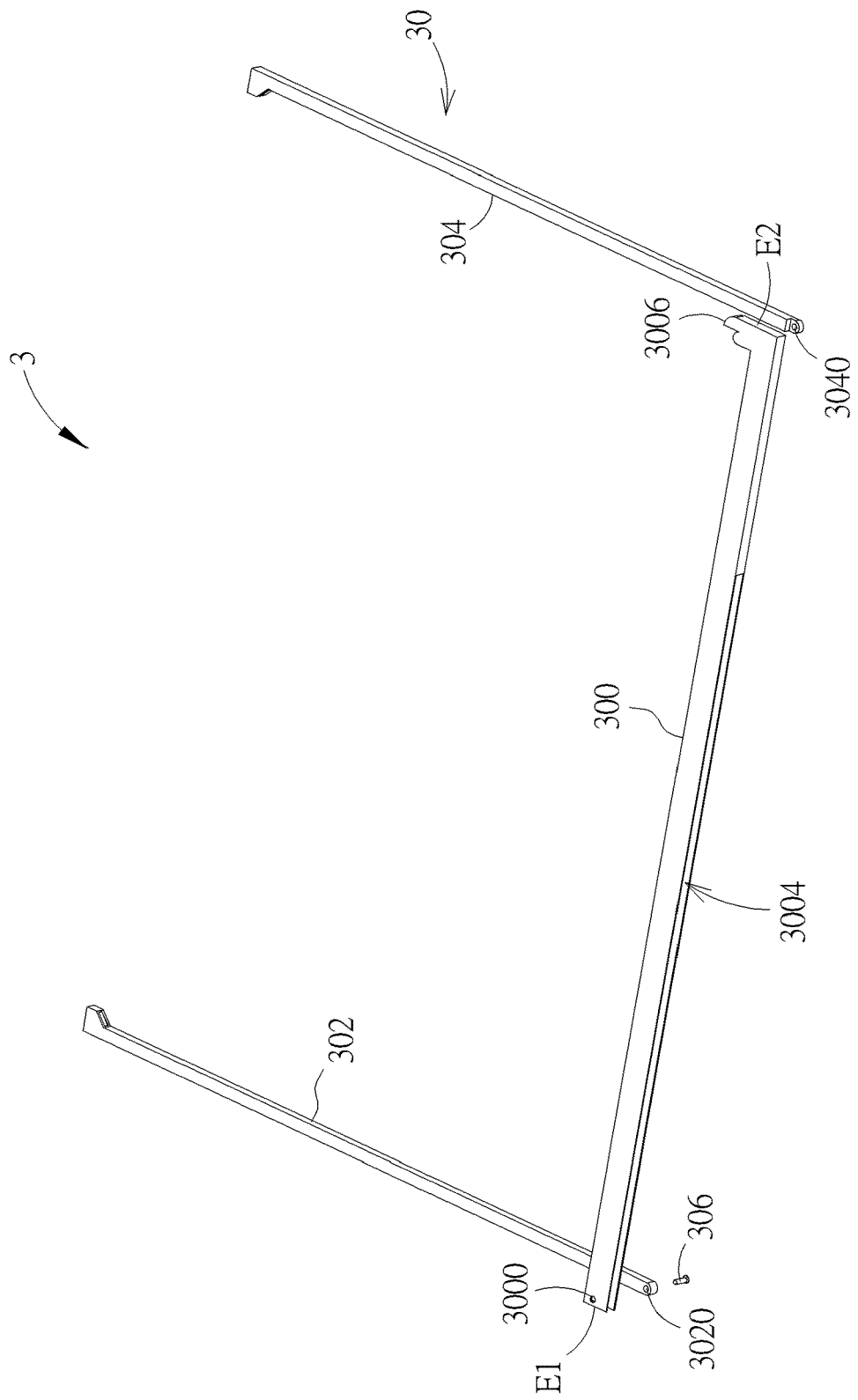
FIG. 12 is an exploded view illustrating the optical touch device shown in FIG. 9 from another viewing angle.
Figure 13:
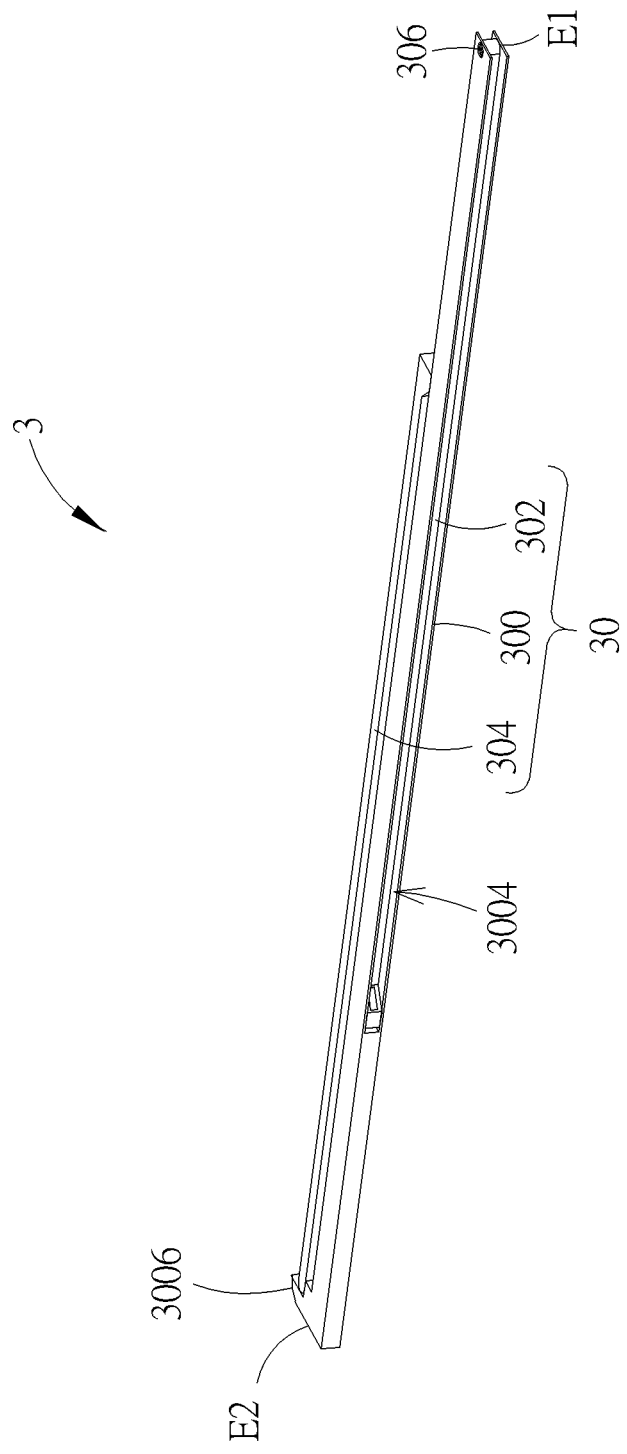
FIG. 13 is a perspective view illustrating the optical touch device shown in FIG. 9 being folded.

Referring to FIGS. 9 to 13, FIG. 9 is a perspective view illustrating an optical touch device 3 being expanded according to another embodiment of the disclosure, FIG. 10 is a perspective view illustrating the optical touch device 3 shown in FIG. 9 from another viewing angle, FIG. 11 is an exploded view illustrating the optical touch device 3 shown in FIG. 9, FIG. 12 is an exploded view illustrating the optical touch device 3 shown in FIG. 9 from another viewing angle, and FIG. 13 is a perspective view illustrating the optical touch device 3 shown in FIG. 9 being folded. As shown in FIG. 9, the optical touch device 3 comprises a foldable frame assembly 30, two image sensing units 32 and two light emitting units 34. The foldable frame assembly 30 comprises a first frame 300, a second frame 302, a third frame 304 and a pivot axle 306. The second frame 302 is pivotally connected to a first end E1 of the first frame 300 and the third frame 304 is pivotally connected to a second end E2 of the first frame 300, wherein the first end E1 is opposite to the second end E2.

As shown in FIGS. 11 and 12, the second frame 302 can be pivotally connected to the first end E1 of the first frame 300 by inserting the pivot axle 306 into a pivot hole 3020 on the second frame 302 and a pivot hole 3000 on the first end E1 of the first frame 300, and a pivot hole 3040 on the third frame 304 can be pivotally connected to a pivot axle 3002 on the second end E2 of the first frame 300. Accordingly, the second frame 302 and the third frame 304 are capable of rotating with respect to the first frame 300 so as to be folded or expanded with respect to the first frame 300. In this embodiment, the first frame 300 has an accommodating recess 3004 and the second frame 302 and the third frame 304 are capable of rotating with respect to the first frame 300 in an identical direction so as to be folded on opposite sides of the first frame 300. As shown in FIG. 13, the second frame 302 is accommodated in the accommodating recess 3004 and the third frame 304 is stacked on the first frame 300.

In this embodiment, the two image sensing units 32 are disposed on the second frame 302 and the third frame 304 respectively and the two light emitting units 34 are also disposed on the second frame 302 and the third frame 304 respectively and adjacent to the two image sensing units 32 respectively, as shown in FIG. 9. In practical applications, the image sensing unit 32 may be, but not limited to, CCD sensor or CMOS sensor; the light emitting unit 34 may be, but not limited to, LED; the first frame 300, the second frame 302 and the third frame 304 may be light-shielding frames or light-reflecting frames. Furthermore, a driving circuit board (not shown) may be disposed in the optical touch device 3, wherein the driving circuit board may be disposed in the first frame 300, the second frame 302 or the third frame 304 and may be electrically connected to the two image sensing units 32 and the two light emitting units 34 by appropriate connection (e.g. through flexible circuit board).

When a user wants to use the optical touch device 3 of the disclosure, he or she can rotate the second frame 302 and the third frame 304 with respect to the first frame 300 so as to expand the foldable frame assembly 30 on any plane (as shown in FIG. 9). Then, the optical touch device 3 can be used with a projector or a computer. When the foldable frame assembly 30 of the optical touch device 3 is expanded, two restraining portions 3006 on the first end E1 and the second end E2 of the first frame 300 can restrain the second frame 302 and the third frame 304 from rotating at a proper position (as shown in FIG. 10) so as to prevent the second frame 302 and the third frame 304 from rotating beyond the limit. After using the optical touch device 3, the user can rotate the second frame 302 and the third frame 304 with respect to the first frame 300 so as to fold up the foldable frame assembly 30 (as shown in FIG. 13). Accordingly, the foldable frame assembly 30 of the disclosure can be stored or transported easily.

Figure 14:
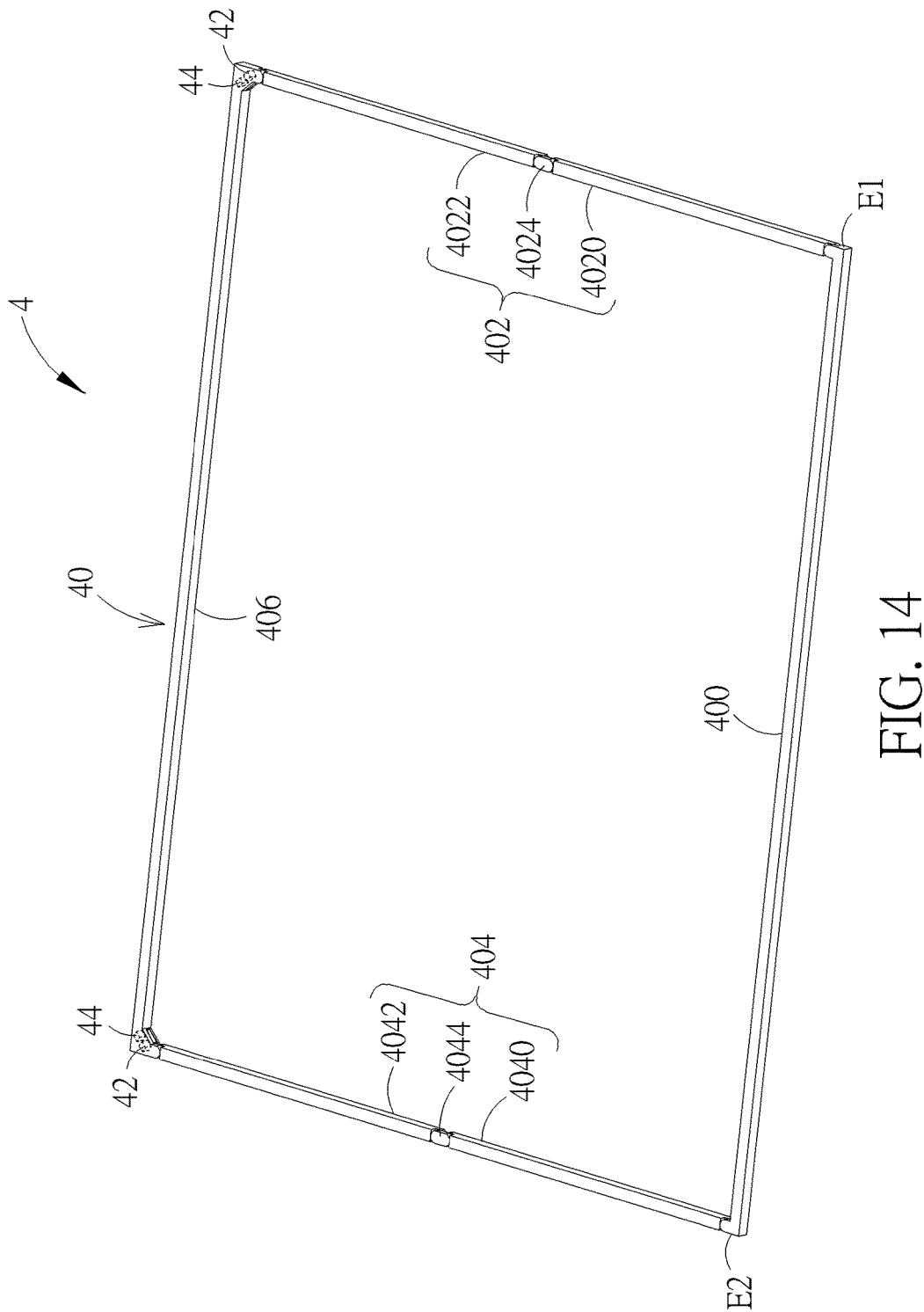
FIG. 14 is a perspective view illustrating an optical touch device being expanded according to another embodiment of the disclosure.
Figure 15:
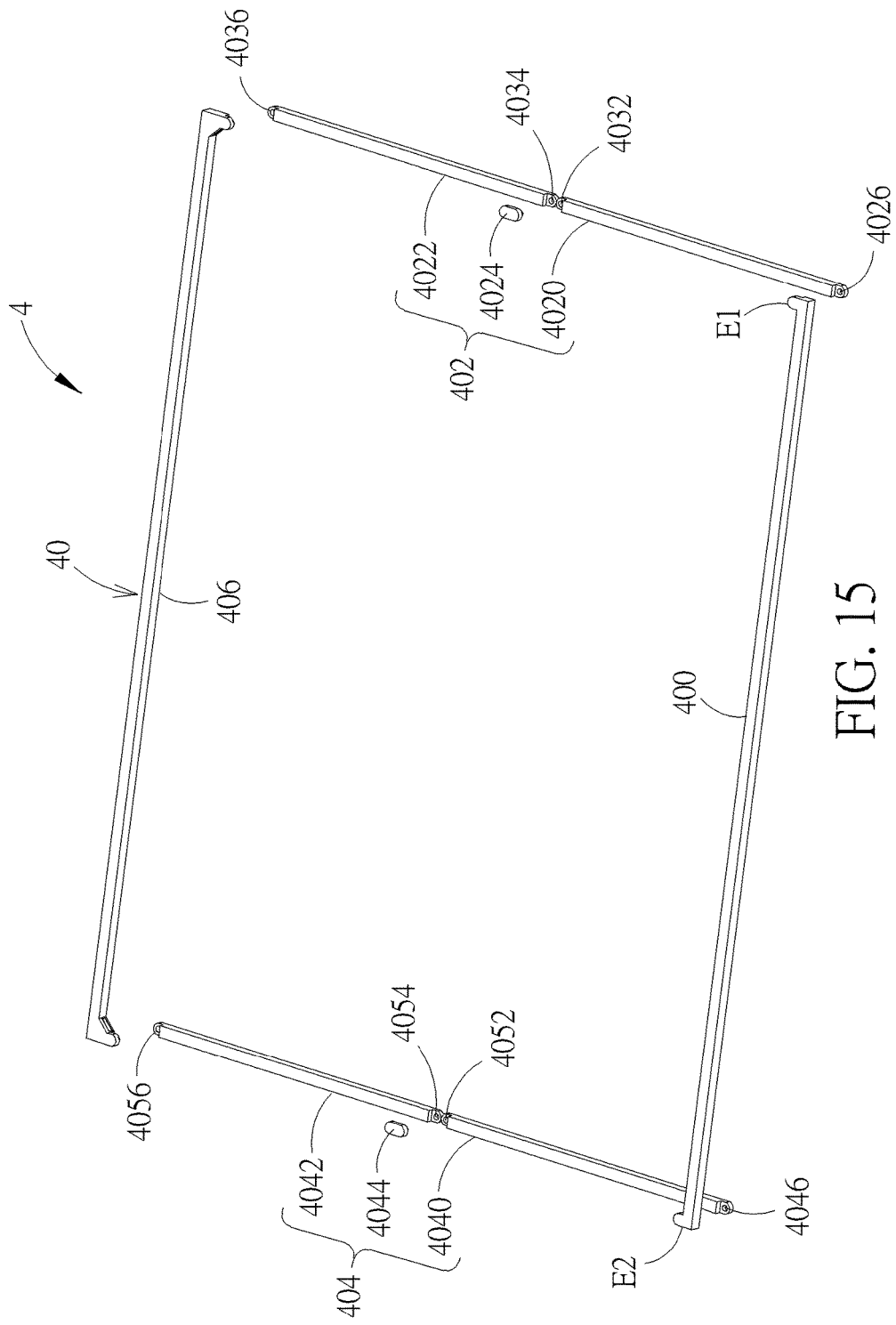
FIG. 15 is an exploded view illustrating the optical touch device shown in FIG. 14.
Figure 16:
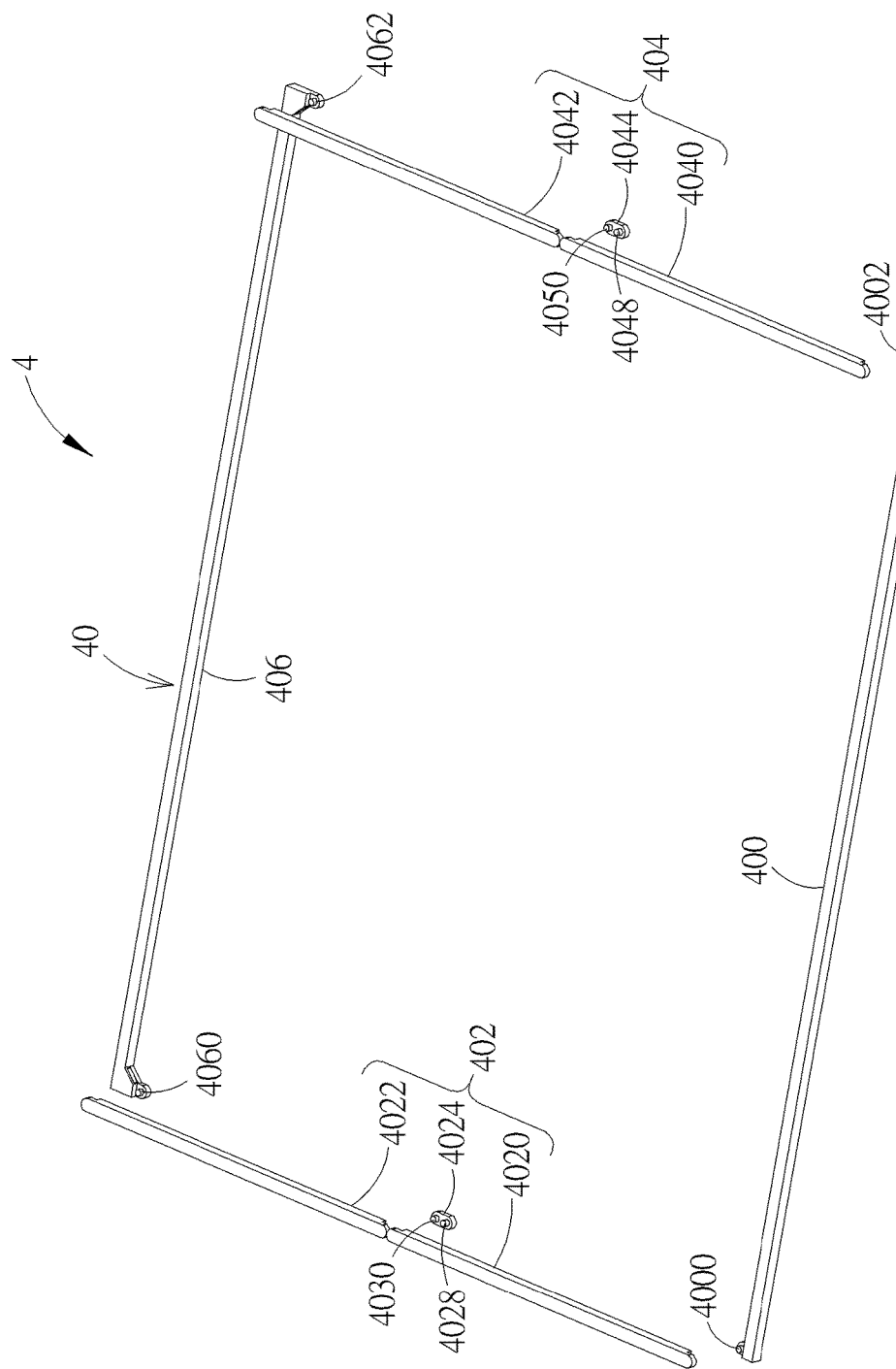
FIG. 16 is an exploded view illustrating the optical touch device shown in FIG. 14 from another viewing angle.
Figure 17:
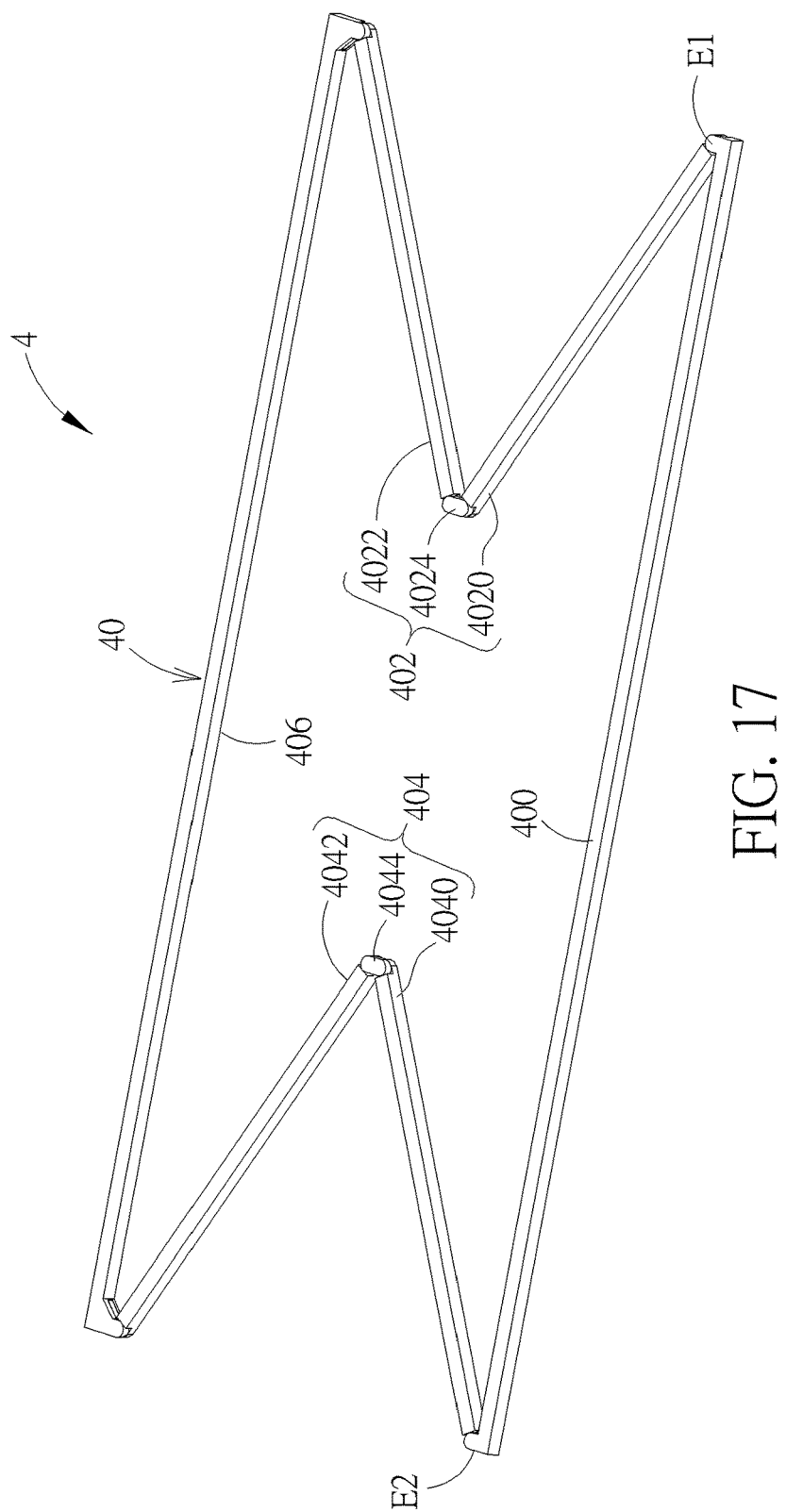
FIG. 17 is a perspective view illustrating the optical touch device shown in FIG. 14 being half-folded.
Figure 18:
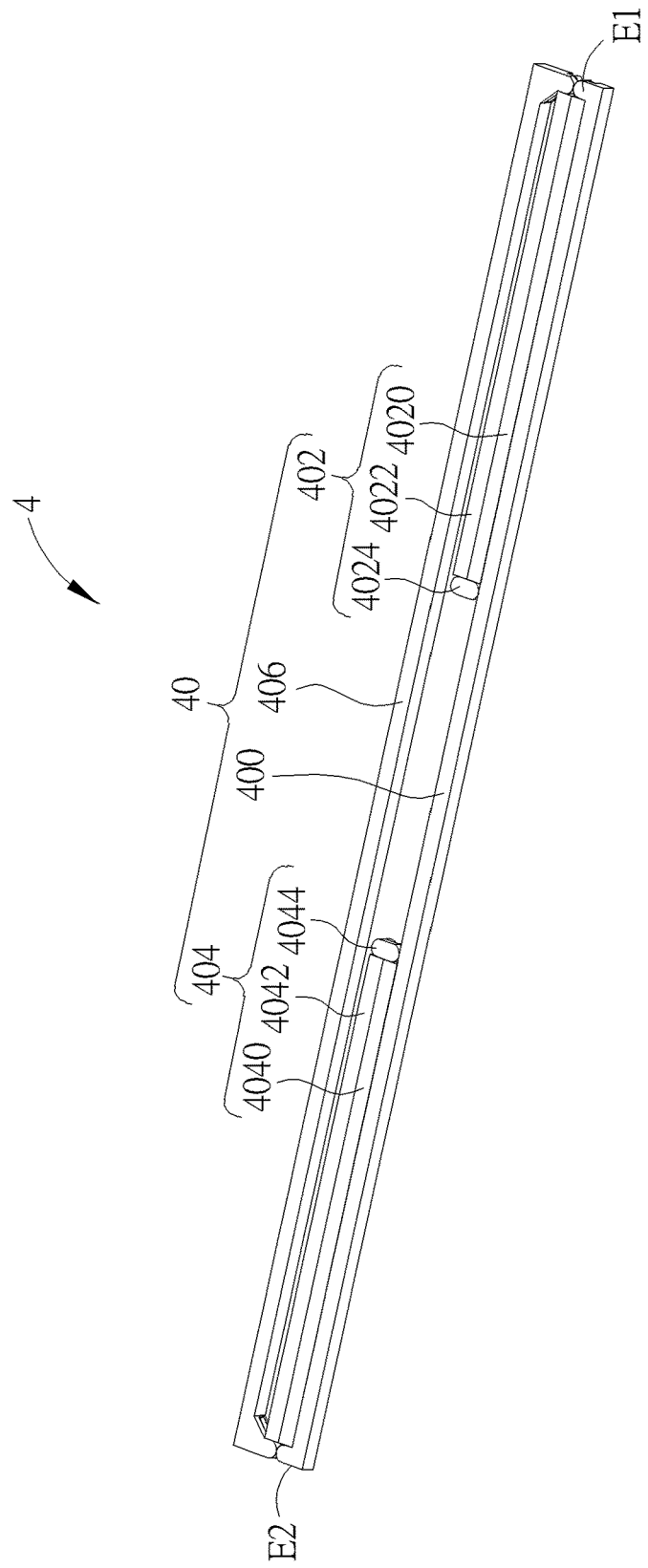
FIG. 18 is a perspective view illustrating the optical touch device shown in FIG. 14 being folded.

Referring to FIGS. 14 to 18, FIG. 14 is a perspective view illustrating an optical touch device 4 being expanded according to another embodiment of the disclosure, FIG. 15 is an exploded view illustrating the optical touch device 4 shown in FIG. 14, FIG. 16 is an exploded view illustrating the optical touch device 4 shown in FIG. 14 from another viewing angle, FIG. 17 is a perspective view illustrating the optical touch device 4 shown in FIG. 14 being half-folded, and FIG. 18 is a perspective view illustrating the optical touch device 4 shown in FIG. 14 being folded. As shown in FIG. 14, the optical touch device 4 comprises a foldable frame assembly 40, two image sensing units 42 and two light emitting units 44. The foldable frame assembly 40 comprises a first frame 400, a second frame 402, a third frame 404 and a fourth frame 406.

The second frame 402 comprises a first sub-frame 4020, a second sub-frame 4022 and a first pivot member 4024, wherein the first sub-frame 4020 is pivotally connected to a first end E1 of the first frame 400 and opposite ends of the first pivot member 4024 are pivotally connected to the first sub-frame 4020 and the second sub-frame 4022 respectively. In other words, the second sub-frame 4022 is pivotally connected to the first sub-frame 4020 through the first pivot member 4024. The third frame 404 comprises a third sub-frame 4040, a fourth sub-frame 4042 and a second pivot member 4044, wherein the third sub-frame 4040 is pivotally connected to a second end E2 of the first frame 400, opposite ends of the second pivot member 4044 are pivotally connected to the third sub-frame 4040 and the fourth sub-frame 4042 respectively, and the first end E1 is opposite to the second end E2. In other words, the fourth sub-frame 406 is pivotally connected to the third sub-frame 4040 through the second pivot member 4044. Opposite ends of the fourth frame 406 are pivotally connected to the second sub-frame 4022 and the fourth sub-frame 4042 respectively.

As shown in FIGS. 15 and 16, a pivot hole 4026 on the first sub-frame 4020 can be pivotally connected to a pivot axle 4000 on the first end E1 of the first frame 400, two pivot axles 4028, 4030 on the first pivot member 4024 can be pivotally connected to a pivot hole 4032 on the first sub-frame 4020 and a pivot hole 4034 on the second sub-frame 4022 respectively, a pivot hole 4046 on the third sub-frame 4040 can be pivotally connected to a pivot axle 4002 on the second end E2 of the first frame 400, two pivot axles 4048, 4050 on the second pivot member 4044 can be pivotally connected to a pivot hole 4052 on the third sub-frame 4040 and a pivot hole 4054 on the fourth sub-frame 4042 respectively, and two pivot axles 4060, 4060 on the fourth frame 406 can be pivotally connected to a pivot hole 4036 on the second sub-frame 4022 and a pivot hole 4056 on the fourth sub-frame 4042 respectively. Accordingly, the first sub-frame 4020, the second sub-frame 4022, the third sub-frame 4040 and the fourth sub-frame 4042 are capable of rotating with respect to the first frame 400 and the fourth frame 406 so as to be folded or expanded between the first frame 400 and the fourth frame 406, as shown in FIGS. 17 and 18.

In this embodiment, the two image sensing units 42 are disposed on opposite ends of the fourth frame 406 respectively and the two light emitting units 44 are also disposed on opposite ends of the fourth frame 406 respectively and adjacent to the two image sensing units 42 respectively, as shown in FIG. 14. In practical applications, the image sensing unit 42 may be, but not limited to, CCD sensor or CMOS sensor; the light emitting unit 44 may be, but not limited to, LED; the first frame 400, the second frame 402 and the third frame 404 may be light-shielding frames or light-reflecting frames. Furthermore, a driving circuit board (not shown) may be disposed in the optical touch device 4, wherein the driving circuit board may be disposed in the first frame 400, the second frame 402, the third frame 404 or the fourth frame 406 and may be electrically connected to the two image sensing units 42 and the two light emitting units 44 by appropriate connection (e.g. through flexible circuit board).

When a user wants to use the optical touch device 4 of the disclosure, he or she can rotate the first sub-frame 4020, the second sub-frame 4022, the third sub-frame 4040 and the fourth sub-frame 4042 with respect to the first frame 400 and the fourth frame 406 so as to expand the foldable frame assembly 40 on any plane (as shown in FIG. 14). Then, the optical touch device 4 can be used with a projector or a computer. After using the optical touch device 4, the user can rotate the first sub-frame 4020, the second sub-frame 4022, the third sub-frame 4040 and the fourth sub-frame 4042 with respect to the first frame 400 and the fourth frame 406 so as to fold up the foldable frame assembly 40 (as shown in FIG. 18). Accordingly, the foldable frame assembly 40 of the disclosure can be stored or transported easily.

Figure 19:
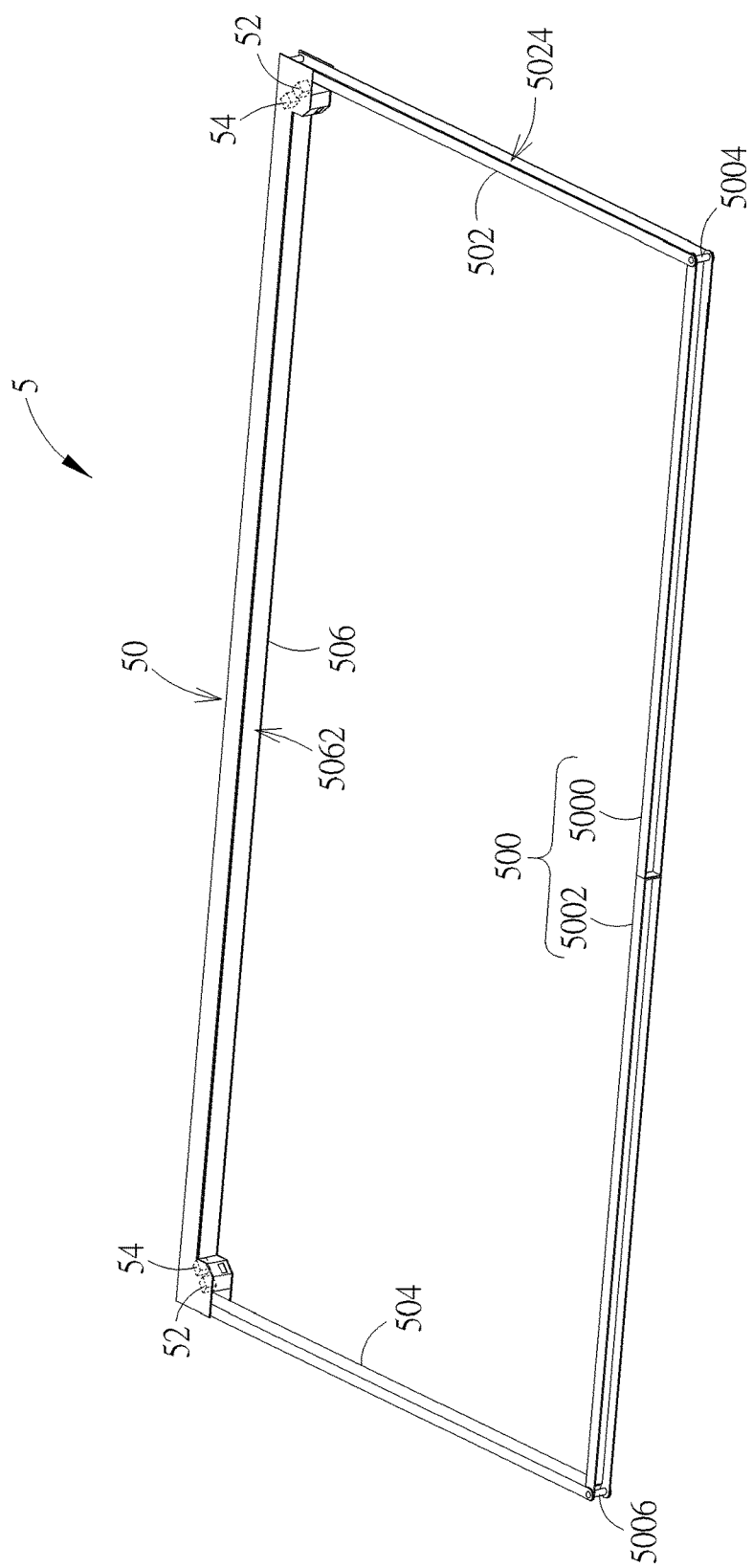
FIG. 19 is a perspective view illustrating an optical touch device being expanded according to another embodiment of the disclosure.
Figure 20:
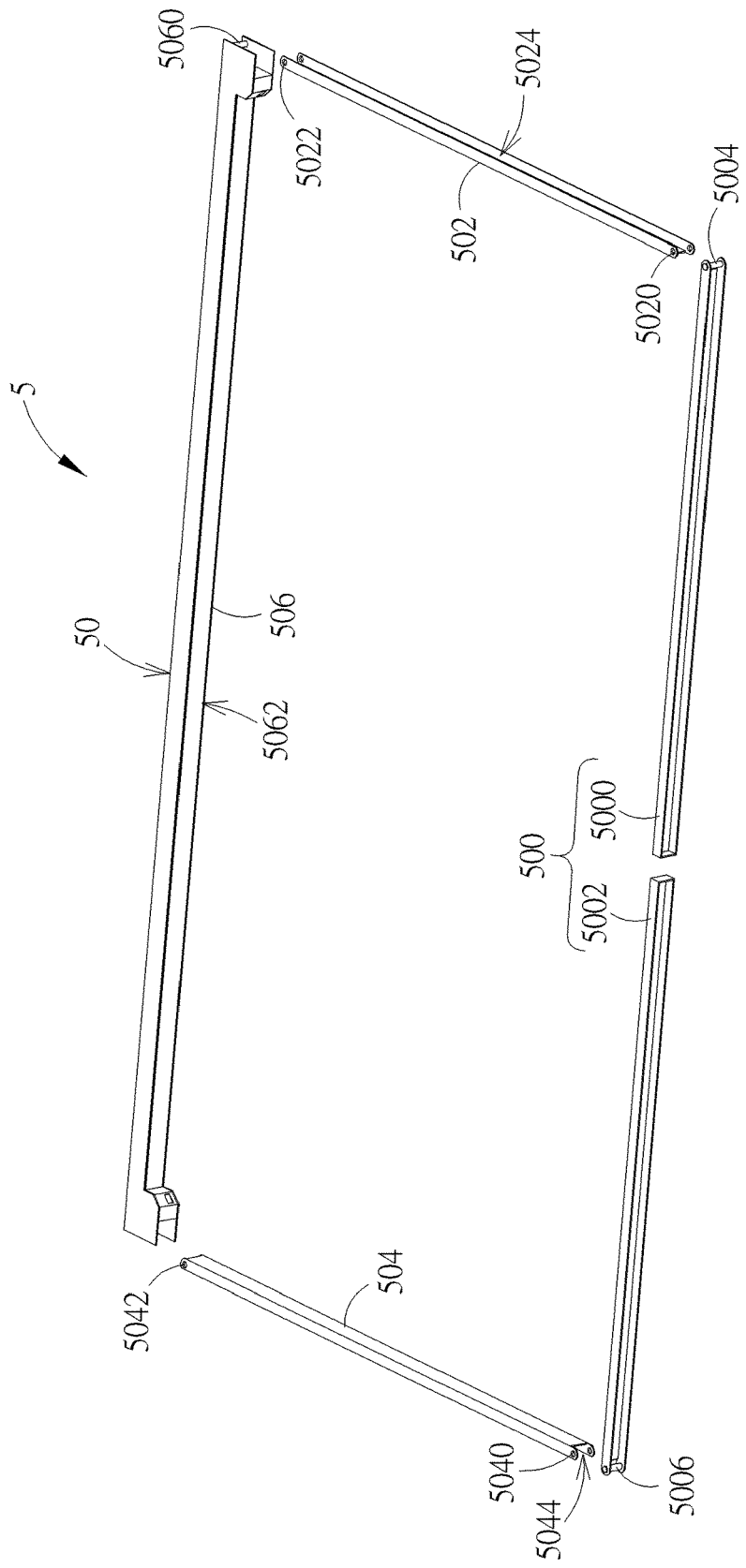
FIG. 20 is an exploded view illustrating the optical touch device shown in FIG. 19.
Figure 21:
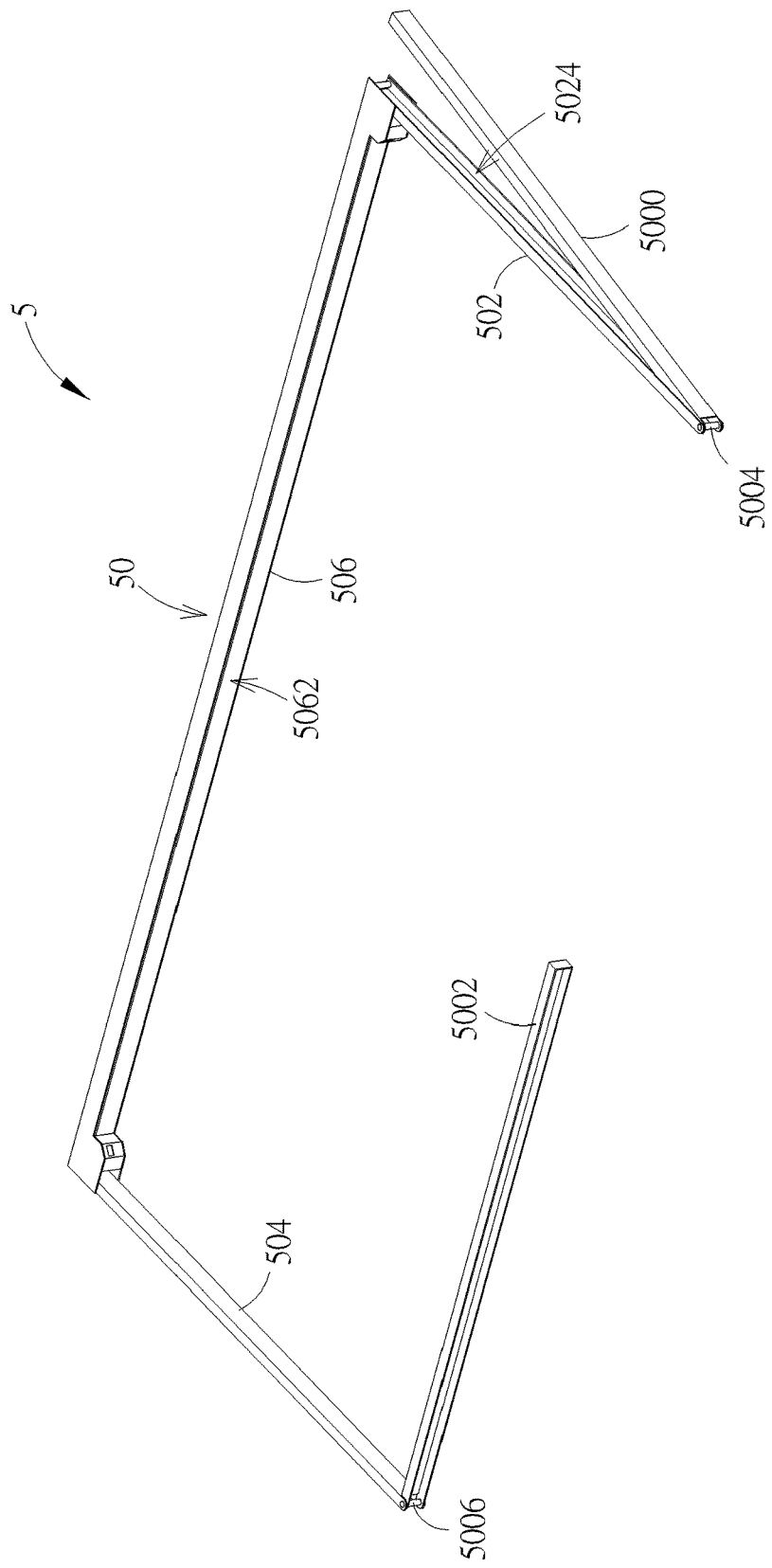
FIG. 21 is a perspective view illustrating the optical touch device shown in FIG. 19 being half-folded.
Figure 22:
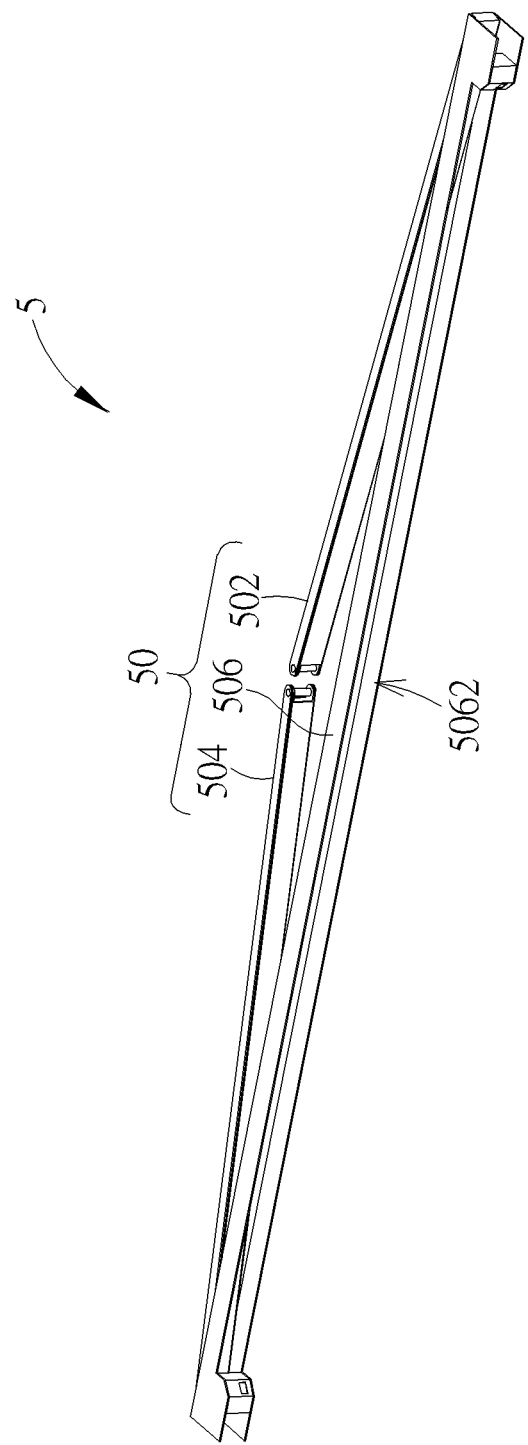
FIG. 22 is a perspective view illustrating the optical touch device shown in FIG. 19 being half-folded.
Figure 23:
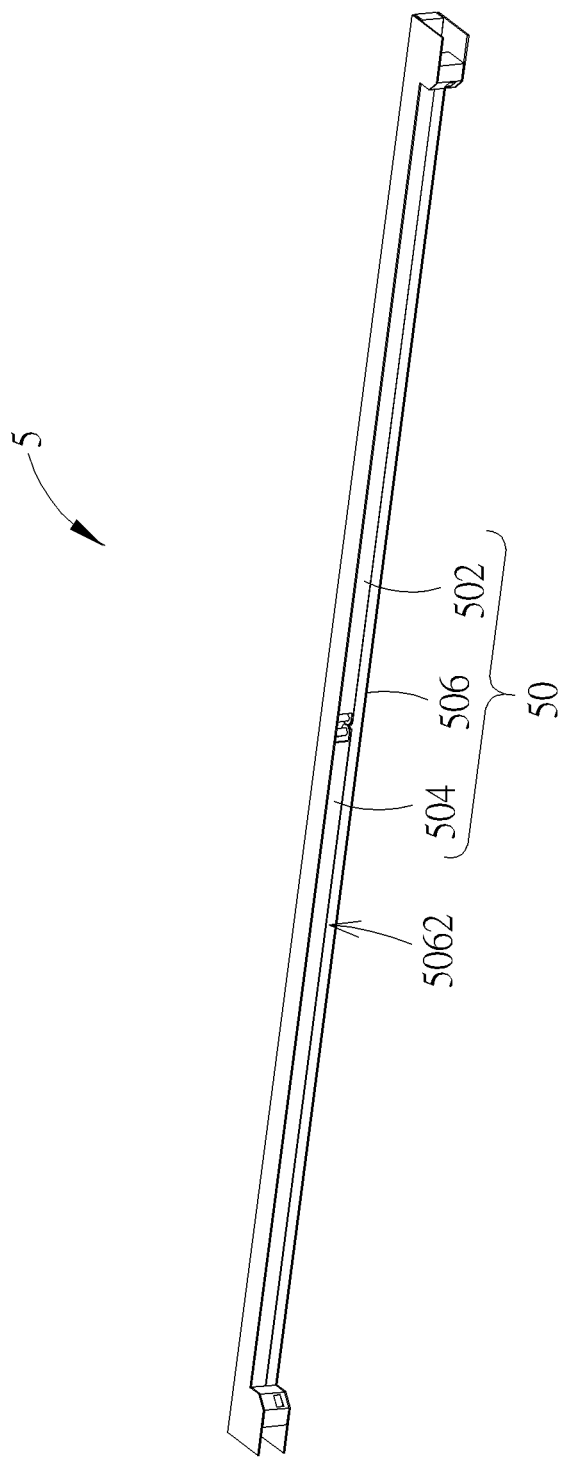
FIG. 23 is a perspective view illustrating the optical touch device shown in FIG. 19 being folded.

Referring to FIGS. 19 to 23, FIG. 19 is a perspective view illustrating an optical touch device 5 being expanded according to another embodiment of the disclosure, FIG. 20 is an exploded view illustrating the optical touch device 5 shown in FIG. 19, FIG. 21 is a perspective view illustrating the optical touch device 5 shown in FIG. 19 being half-folded, FIG. 22 is a perspective view illustrating the optical touch device 5 shown in FIG. 19 being half-folded, and FIG. 23 is a perspective view illustrating the optical touch device 5 shown in FIG. 19 being folded. As shown in FIG. 19, the optical touch device 5 comprises a foldable frame assembly 50, two image sensing units 52 and two light emitting units 54. The foldable frame assembly 50 comprises a first frame 500, a second frame 502, a third frame 504 and a fourth frame 506.

The first frame 500 comprises a first sub-frame 5000 and a second sub-frame 5002, wherein the first sub-frame 5000 and the second sub-frame 5002 are detachably connected to each other. The second frame 502 is pivotally connected to the first sub-frame 5000. The third frame 504 is pivotally connected to the second sub-frame 5002. Opposite ends of the fourth frame 506 are pivotally connected to the second frame 502 and the third frame 504 respectively.

As shown in FIG. 20, a pivot hole 5020 on the second frame 502 can be pivotally connected to a pivot axle 5004 on the first sub-frame 5000, a pivot hole 5040 on the third frame 504 can be pivotally connected to a pivot axle 5006 on the second sub-frame 5002, and two pivot axles 5060 on the fourth frame 506 can be pivotally connected to a pivot hole 5022 on the second frame 502 and a pivot hole 5042 on the third frame 504 respectively. It should be noted that there is only one pivot axle 5060 on one end of the fourth frame 506 shown in FIG. 20 due to the viewing angle. Accordingly, when the first sub-frame 5000 and the second sub-frame 5002 are detached from each other, the first sub-frame 5000 and the second sub-frame 5002 are capable of rotating with respect to the second frame 502 and the third frame 504 respectively and the second frame 502 and the third frame 504 are capable of rotating with respect to the fourth frame 506 so as to be folded with respect to the fourth frame 506. In this embodiment, the second frame 502 has a first accommodating recess 5024 for accommodating the first sub-frame 5000, the third frame 504 has a second accommodating recess 5044 for accommodating the second sub-frame 5002, and the fourth frame 506 has a third accommodating recess 5062 for accommodating the second frame 502 and the third frame 504.

When a user wants to fold up the optical touch device 5, he or she can rotate the first sub-frame 5000 with respect to the second frame 520 first so as to accommodate the first sub-frame 5000 in the first accommodating recess 5024, as shown in FIG. 21. Afterward, the user can rotate the second sub-frame 5002 with respect to the third frame 504 so as to accommodate the second sub-frame 5002 in the second accommodating recess 5044. Then, the user can rotate the second frame 502 and the third frame 504 with respect to the fourth frame 506 so as to accommodate the second frame 502 and the third frame 504 in the third accommodating recess 5062, as shown in FIGS. 22 and 23.

In this embodiment, the two image sensing units 52 are disposed on opposite ends of the fourth frame 506 respectively and the two light emitting units 54 are also disposed on opposite ends of the fourth frame 506 respectively and adjacent to the two image sensing units 52 respectively, as shown in FIG. 19. In practical applications, the image sensing unit 52 may be, but not limited to, CCD sensor or CMOS sensor; the light emitting unit 54 may be, but not limited to, LED; the first frame 500, the second frame 502 and the third frame 504 may be light-shielding frames or light-reflecting frames. Furthermore, a driving circuit board (not shown) may be disposed in the optical touch device 5, wherein the driving circuit board may be disposed in the first frame 500, the second frame 502, the third frame 504 or the fourth frame 506 and may be electrically connected to the two image sensing units 52 and the two light emitting units 54 by appropriate connection (e.g. through flexible circuit board).

When a user wants to use the optical touch device 5 of the disclosure, he or she can rotate the second frame 502 and the third frame 504 with respect to the fourth frame 506 and then rotate the first sub-frame 5000 and the second sub-frame 5002 with respect to the second frame 502 and the third frame 504 respectively so as to expand the foldable frame assembly 50 on any plane (as shown in FIG. 19). Then, the optical touch device 5 can be used with a projector or a computer. After using the optical touch device 5, the user can rotate the first sub-frame 5000 and the second sub-frame 5002 with respect to the second frame 502 and the third frame 504 respectively and then rotate the second frame 502 and the third frame 504 with respect to the fourth frame 506 so as to fold up the foldable frame assembly 50 (as shown in FIG. 23). Accordingly, the foldable frame assembly 50 of the disclosure can be stored or transported easily.

As mentioned in the above, the frames of the foldable frame assembly of the disclosure are pivotally connected to each other such that the frames can rotate with respect to each other so as to be folded or expanded. When a user uses the optical touch device of the disclosure, he or she can rotate the frames of the foldable frame assembly with respect to each other so as to expand the foldable frame assembly on any plane. Then, the optical touch device can be used with a projector or a computer. After using the optical touch device, the user can rotate the frames of the foldable frame assembly so as to fold up the foldable frame assembly. Accordingly, the foldable frame assembly of the disclosure can be stored or transported easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
   a foldable frame assembly comprising:
   a first frame;
   a second frame comprising a first sub-frame and a second sub-frame, the first sub-frame being pivotally connected to a first end of the first frame, the second sub-frame being pivotally connected to the first sub-frame;
   a third frame comprising a third sub-frame and a fourth sub-frame, the third sub-frame being pivotally connected to a second end of the first frame, the fourth sub-frame being pivotally connected to the third sub-frame, the first end being opposite to the second end; and
   a fourth frame, opposite ends of the fourth frame being pivotally connected to the second sub-frame and the fourth sub-frame respectively, the first, second, third and fourth sub-frames being capable of rotating with respect to the first and fourth frames so as to be folded or expanded between the first and fourth frames;
   two image sensing units disposed on opposite ends of the fourth frame respectively; and
   two light emitting units disposed on opposite ends of the fourth frame respectively and adjacent to the two image sensing units respectively.

2. The optical touch device of claim 1, wherein the second frame further comprises a first pivot member, opposite ends of the first pivot member are pivotally connected to the first and second sub-frames respectively, the third frame further comprises a second pivot member, and opposite ends of the second pivot member are pivotally connected to the third and fourth sub-frames respectively.

3. An optical touch device comprising:
a foldable frame assembly comprising:
- a first frame comprising a first sub-frame and a second sub-frame, the first sub-frame and the second sub-frame being detachably connected to each other;
- a second frame pivotally connected to the first sub-frame;
- a third frame pivotally connected to the second sub-frame; and
- a fourth frame, opposite ends of the fourth frame being pivotally connected to the second frame and the third frame respectively, wherein when the first sub-frame and the second sub-frame are detached from each other, the first sub-frame and the second sub-frame are capable of rotating with respect to the second frame and the third frame respectively and the second frame and the third frame are capable of rotating with respect to the fourth frame so as to be folded with respect to the fourth frame;

two image sensing units disposed on opposite ends of the fourth frame respectively; and two light emitting units disposed on opposite ends of the fourth frame respectively and adjacent to the two image sensing units respectively.

4. The optical touch device of claim 3, wherein the second frame has a first accommodating recess for accommodating the first sub-frame, the third frame has a second accommodating recess for accommodating the second sub-frame, and the fourth frame has a third accommodating recess for accommodating the second frame and the third frame.

* * * * *